(12) United States Patent
Kim et al.

(10) Patent No.: US 7,710,526 B2
(45) Date of Patent: May 4, 2010

(54) ARRAY SUBSTRATE FOR IN-PLANE SWITCHING MODE LIQUID CRYSTAL DISPLAY DEVICE AND METHOD OF FABRICATING THE SAME

(75) Inventors: Do-Sung Kim, Gumi-si (KR); Byung-Chul Ahn, Annyang-si (KR)

(73) Assignee: LG. Display Co., Ltd., Seoul (KR)

( * ) Notice: Subject to any disclaimer, the term of this patent is extended or adjusted under 35 U.S.C. 154(b) by 371 days.

(21) Appl. No.: 11/644,716

(22) Filed: Dec. 22, 2006

(65) Prior Publication Data

US 2007/0153204 A1 Jul. 5, 2007

(30) Foreign Application Priority Data

Dec. 29, 2005 (KR) .................... 10-2005-0133552

(51) Int. Cl.
*G02F 1/1343* (2006.01)
(52) U.S. Cl. .................. 349/143; 349/148; 349/138
(58) Field of Classification Search ................ 349/139, 349/141, 143, 148
See application file for complete search history.

(56) References Cited

U.S. PATENT DOCUMENTS 6,646,707 B2 11/2003 Noh et al.
2002/0041354 A1 4/2002 Noh et al.
2006/0146255 A1* 7/2006 Ahn ........................... 349/141
2007/0002246 A1* 1/2007 Chang et al. ................ 349/141

FOREIGN PATENT DOCUMENTS

| KR | 1999-0062389 | 7/1999 |
| KR | 10-2001-0039664 | 5/2001 |
| KR | 10-2001-0112586 | 12/2001 |

* cited by examiner

*Primary Examiner*—Sarah Song
(74) *Attorney, Agent, or Firm*—Brinks Hofer Gilson & Lione

(57) ABSTRACT

An array substrate for an IPS mode LCD device comprises a substrate; a gate line along a first direction; a data line along a second direction; a TFT connected to the gate and data lines; a common electrode having a plate shape on the substrate and formed of a first transparent conductive material; and a pixel electrode formed of a second transparent conductive material on the common electrode and including first and second portions and a plurality of third portions combining the first portion with the second portion. The first and second portions are parallel to the second direction and separated from each other and the plurality of third portions are oblique to the first and second portions and separated from one another.

10 Claims, 25 Drawing Sheets

ARRAY SUBSTRATE FOR IN-PLANE SWITCHING MODE LIQUID CRYSTAL DISPLAY DEVICE AND METHOD OF FABRICATING THE SAME

The present application claims the benefit of Korean Patent Application No. 2005-0133552 filed in Korea on Dec. 29, 2005, which is hereby incorporated by reference.

BACKGROUND OF THE INVENTION

1. Field of the Invention

The present invention relates to a liquid crystal display (LCD) device, and more particularly, to an array substrate for an in-plane switching (IPS) mode LCD device and method of fabricating the same that is capable of having high luminance and a wide viewing angle.

2. Discussion of the Related Art

The liquid crystal molecules for an LCD device have orientation arrangement characteristics resulting from their thin and long shape. An arrangement direction of the liquid crystal molecules can be controlled by applying an electrical field to them. Thus, the LCD device displays images using a variation of transmittance of the liquid crystal molecules by controlling magnitudes of the electric field. The LCD device including a thin film transistor (TFT) as a switching element, referred to as an active matrix LCD (AM-LCD) device, has excellent high resolution characteristics and displaying characteristics for moving images.

A conventional LCD device includes a first substrate, a second substrate and a liquid crystal layer. The first substrate includes a pixel electrode, and the second substrate includes a color filter layer and a common electrode. The first and second substrates face each other, and the liquid crystal layer is interposed therebetween. The conventional LCD device displays images using a vertical electric field between the pixel and common electrodes. The LCD device using the vertical electric field has a high transmittance and a high aperture ratio. However, the LCD device has a narrow viewing angle, low contrast ratio, and other issues.

To resolve the above-mentioned problems, the IPS mode LCD device having a wide viewing angle may be used.

FIG. 1 is a schematic cross-sectional view of an IPS mode LCD device according to the related art. As shown in FIG. 1, the IPS mode LCD device includes first and second substrates 10 and 40 and a liquid crystal layer LC. The first and second substrates 10 and 40 face each other, and the liquid crystal layer LC is interposed therebetween. The first and second substrates 10 and 40 may be referred to as an array substrate and a color filter substrate, respectively.

A pixel region P is defined on the first substrate 10. A thin film transistor (TFT) T, a common electrode 30 and a pixel electrode 32 are formed on the first substrate 10 in the pixel region P. The TFT T includes a gate electrode 14 on the first substrate 10, a gate insulating layer 16 on the gate electrode 14, a semiconductor layer 18 on the gate insulating layer 16, and source and drain electrodes 20 and 22 on the semiconductor layer 18. The gate and source electrodes 14 and 20 extend from the gate and data lines 12 and 24, respectively, and the source and drain electrodes 20 and 22 are separated from each other. The common and pixel electrode 30 and 32 may be formed of a transparent conductive material. The common and pixel electrode 30 and 32 are alternately arranged with and parallel to each other. The pixel electrode 32 is connected to the TFT T. The liquid crystal layer LC is driven by an electric field induced between the common and pixel electrodes 30 and 32.

Although not shown in FIG. 1, gate and data lines are formed on the first substrate 10 to define the pixel region P, and a common line is formed on the first substrate 10 to apply voltage into the common electrode 30.

The second substrate 40 includes a black matrix 42 and a color filter 44. The black matrix 42 corresponds to the gate line (not shown), the data line (not shown) and the TFT T. The color filter 44, which includes sub-color filters 44a and 44b, corresponds to the pixel region P. The color filter 44 includes one of red R, green G and blue (not shown) color.

FIG. 2 is a schematic plane view of an array substrate for an IPS mode LCD device according to the related art.

The gate and data lines 12 and 24 are formed on the first substrate 10 to define the pixel region P, and a common line 15 is parallel to and separated from the gate line 12. The TFT T is formed in the pixel region P to be connected to the gate and data lines 12 and 24. The TFT T includes the gate electrode 14, the gate insulating layer 16 (of FIG. 1), the semiconductor layer 18 and the source and drain electrodes 20 and 22. The gate and source electrodes 14 and 20 extend from the gate and data lines 12 and 24, respectively, and the source and drain electrodes 20 and 22 are separated from each other. Moreover, the common and pixel electrodes 30 and 32 are formed in the pixel region P. The pixel electrode 32 is connected to the TFT T and alternately arranged with the common electrode 30. The common electrode 30 extends from the common line 15 so as to be perpendicular to the common line 15. The common and pixel electrodes 30 and 32 are parallel to each other.

To improve luminance of images and aperture ratio, the pixel and common electrodes 32 and 30 are formed of the transparent conductive material. However, since the effective electric filed, which drives the liquid crystal layer LC (of FIG. 1), is induced not on the pixel and common electrodes 32 and 30 but between the pixel and common electrode 32 and 30, there are problems of deficiency of luminance and aperture ratio.

To resolve these problems in the IPS mode LCD device, an advanced horizontal in-plane switching (AH-IPS) mode LCD device may be used. The pixel electrodes of the AH-IPS mode LCD device has a much narrower distance between them than the IPS mode LCD device, and the common electrode has a plate shape. The pixel electrodes are formed on the common electrode. The AH-IPS mode LCD device has a wide viewing angle in left and right sides and high contrast ratio. Moreover, there is no color shift.

FIG. 3 is a plane view of an array substrate for an AH-IPS mode LCD device according to the related art.

As shown in FIG. 3, the array substrate for the AH-IPS mode LCD device includes the gate and data lines 54 and 72, the TFT T, the common electrode 52 and the plurality of pixel electrodes 78 on a substrate 50. The gate and data lines 54 and 72 cross each other to define the pixel region P on the substrate 50. The TFT T is connected to the gate and data lines 54 and 72. The TFT T includes the gate electrode 56, the gate insulating layer (not shown), the semiconductor layer 62 and the source and drain electrodes 68 and 70. The semiconductor layer 62 includes an active layer (not shown) and an ohmic contact layer (not shown). The gate and source electrodes 56 and 68 extend from the gate and data lines 54 and 72, respectively, and the drain electrode 70 is separated from the source electrode 68.

The common electrode 52 is plate shaped and is formed in an entire surface of the pixel region. The plurality of pixel electrodes 78 is formed on the common electrode 52. The plurality of pixel electrodes 78 are bar shaped. The plurality of pixel electrodes 78 extend from first and second connection lines 78a and 78b. The plurality of pixel electrodes 78 are connected to one another by the first and second connection lines 78a and 78b. The plurality of pixel electrodes 78 are separated from one another in a center region of the pixel region P. The first connection line 78a is connected to the drain electrode 70, and the second connection line 78b may overlap the gate line 54.

The liquid crystal layer (not shown) is driven by the electric field between the common and pixel electrode 52 and 78. Since the distance between the common and pixel electrodes 52 and 78 is much close than the conventional IPS mode LCD device, the electric field effectively drives liquid crystal molecules of the liquid crystal layer (not shown) on the pixel electrode 78 such that the AH-IPS mode LCD device has higher luminance than the conventional IPS-mode LCD device.

FIGS. 4A and 4B are cross-sectional view taken along the lines IVa-IVa and IVb-IVb of FIG. 3.

As shown in FIG. 4A, the TFT T is formed in pixel region P on the substrate 50. The TFT T includes the gate electrode 56 on the substrate 50, the gate insulating layer 58 on the gate electrode 56, the semiconductor layer 62, which includes the active layer 62a and the ohmic contact layer 62b, on the gate insulating layer 58, the source and drain electrodes 68 and 70 on the semiconductor layer 62.

The common electrode 52 is formed of the transparent conductive material on the substrate 50. An insulating layer 53 is interposed between the common electrode 52 and the gate electrode 56. The first connection line 78a is formed over the TFT T with the passivation layer 74 therebetween. The first connection line 78a is connected to the drain electrode 68 through a drain contact hole 76 of the passivation layer 74.

As shown in FIG. 4B, the plurality of bar shaped pixel electrodes 78 correspond to the common electrode 52. The plurality of pixel electrodes 78 extend from the first connection line 78a (of FIG. 4A) to be connected to one another. The data line 72 is formed on the gate insulating layer 58 and at both sides of the pixel region P.

The AH-IPS mode LCD device has the wide viewing angle and high contrast ratio. However, since the pixel electrodes 78 overlap the common electrode 52, there are a storage capacities generated between the pixel and common electrodes 78 and 52. The storage capacities between the pixel and common electrodes 78 and 52 in the AH-IPS mode LCD device may be five times as much as the storage capacity in the conventional IPS-mode LCD device shown in FIGS. 1 and 2. It requires that the TFT T in the AH-IPS mode LCD device has a greater size than the conventional IPS-mode LCD device shown in FIGS. 1 and 2 such that aperture ratio in the AH-IPS mode LCD device is reduced. Moreover, since the pixel electrodes are arranged to be parallel to the data line 72 (of FIG. 3), the viewing angle in upper and lower sides and a diagonal direction is deteriorated.

SUMMARY

Accordingly, the present invention is directed to an IPS mode LCD device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An array substrate for an IPS mode LCD device comprises a substrate; a gate line along a first direction; a data line along a second direction; and a TFT connected to the gate and data lines. A common electrode having a plate shape is formed of a first transparent conductive material. A pixel electrode is formed of a second transparent conductive material on the common electrode and includes first and second portions and a plurality of third portions combining the first portion with the second portion. The first and second portions are parallel to the second direction and separated from each other, and the plurality of third portions are oblique to the first and second portions and separated from one another.

In another aspect of the present invention, a method of fabricating an array substrate for an IPS mode LCD device comprises forming a common electrode including a transparent conductive material and a plate shape on a substrate using a first mask. A gate line is formed along a first direction and a gate electrode is formed on the substrate having the common electrode, using a second mask. A gate insulating layer is formed on the common electrode, the gate line and the gate electrode. A semiconductor layer is formed on the gate insulating layer and corresponding to the gate electrode using a third mask. Source and drain electrodes and a data line are formed on the semiconductor layer and the gate insulating layer using a fourth mask. The source and drain electrodes are separated from each other, and the data line is arranged along a second direction; forming a passivation layer including a drain contact hole on the source and drain electrodes and the data line using a fifth mask. The drain contact hole exposes the drain electrode. A pixel electrode is formed connected to the drain electrode through the drain contact hole on the passivation layer using a sixth mask. The pixel electrode includes first and second portions and a plurality of third portions combining the first portion with the second portion. The first and second portions are parallel to the second direction and separated from each other. The plurality of third portions are oblique to the first and second portions and separated from one another.

In another aspect of the present invention, a method of fabricating an array substrate for an IPS mode LCD device comprises forming a gate line along a first direction, a gate electrode and a common electrode of a plate shape on a substrate using a first mask. A gate insulating layer is formed on the gate line, the gate electrode and the common electrode. A semiconductor layer is formed on the gate insulating layer and corresponding to the gate electrode using a second mask. Source and drain electrodes and a data line are formed on the semiconductor layer and the gate insulating layer using a third mask. The source and drain electrodes are separated from each other, and the data line is arranged along a second direction. A passivation layer including a drain contact hole is formed on the source and drain electrodes and the data line using a fourth mask. The drain contact hole exposes the drain electrode. A pixel electrode is formed connected to the drain electrode through the drain contact hole on the passivation layer using a fifth mask. The pixel electrode includes first and second portions and a plurality of third portions combining the first portion with the second portion. The first and second portions are parallel to the second direction and separated from each other. The plurality of third portions are oblique to the first and second portions and separated from one another.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
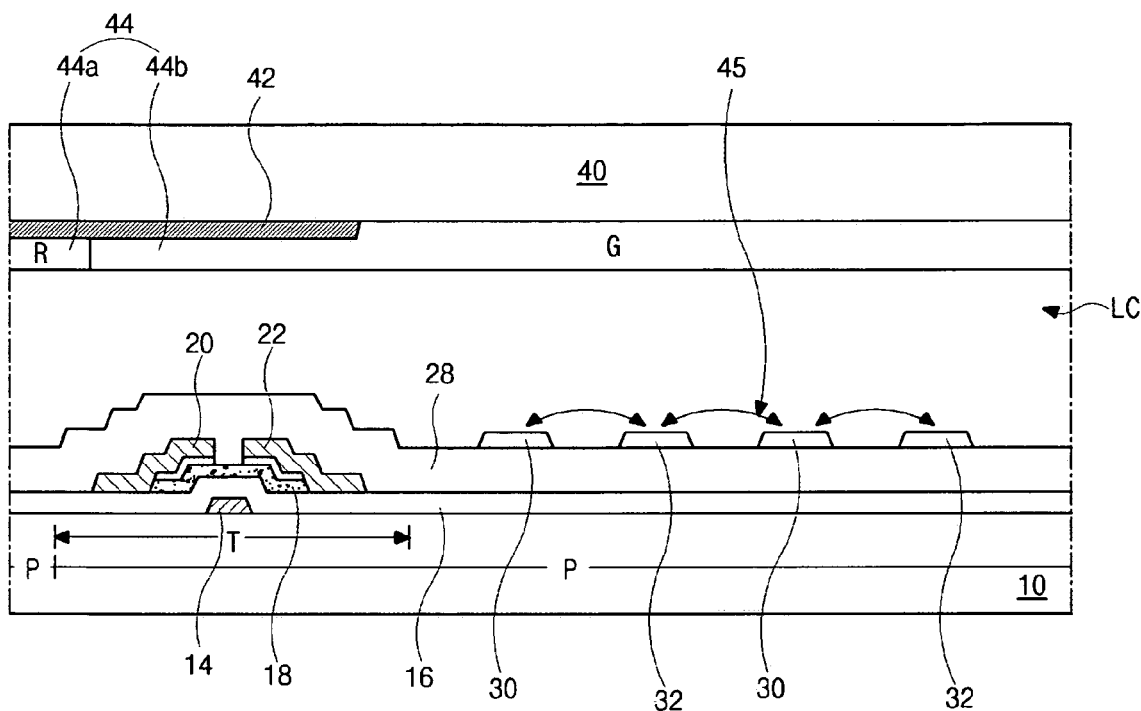
FIG. 1 is a schematic cross-sectional view of an IPS mode LCD device according to the related art.
Figure 2:
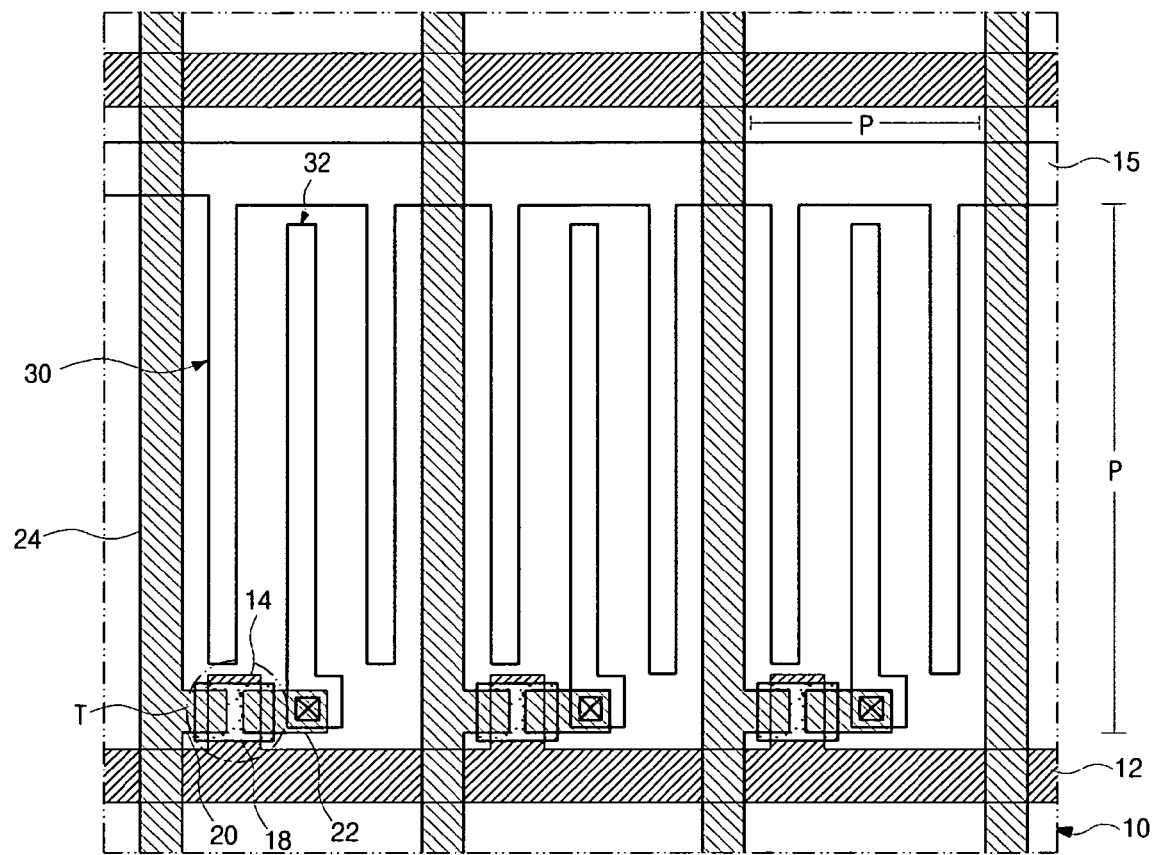
FIG. 2 is a schematic plane view of an array substrate for an IPS mode LCD device according to the related art.
Figure 3:
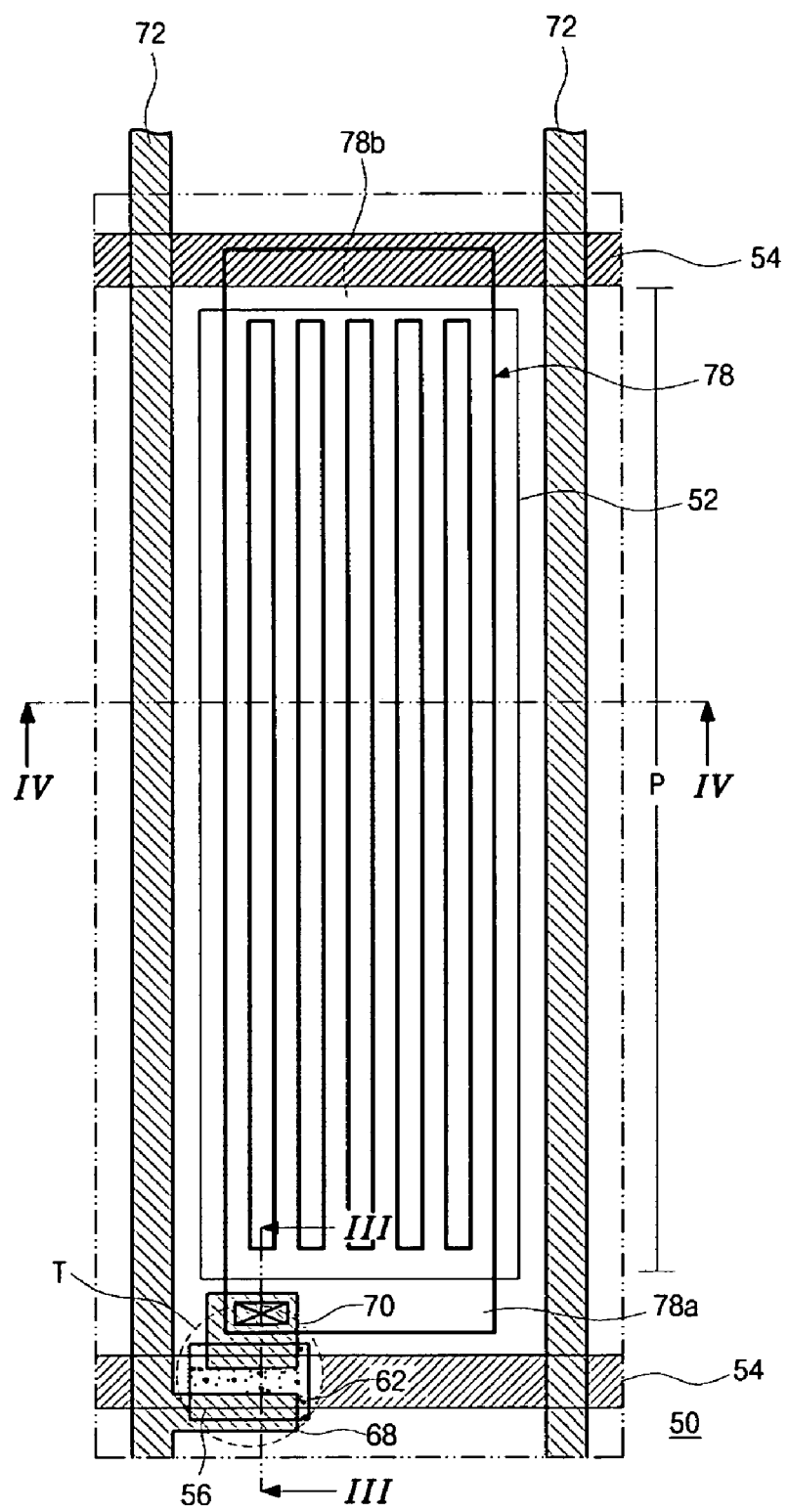
FIG. 3 is a plane view of an array substrate for an AH-IPS mode LCD device according to the related art.
Figure 4A:
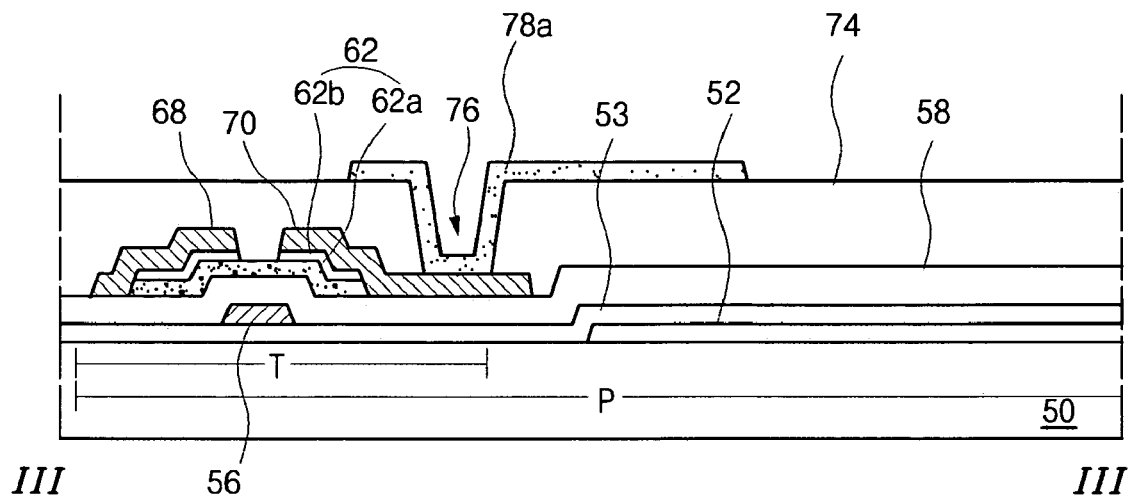
FIGS. 4A and 4B are cross-sectional view taken along the lines III-III and IV-IV of FIG. 3.
Figure 4B:
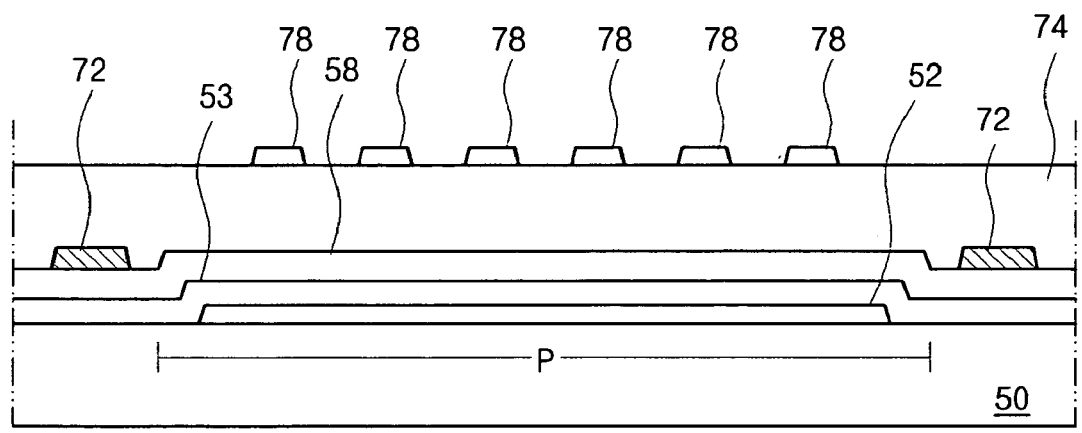
Figure 5:
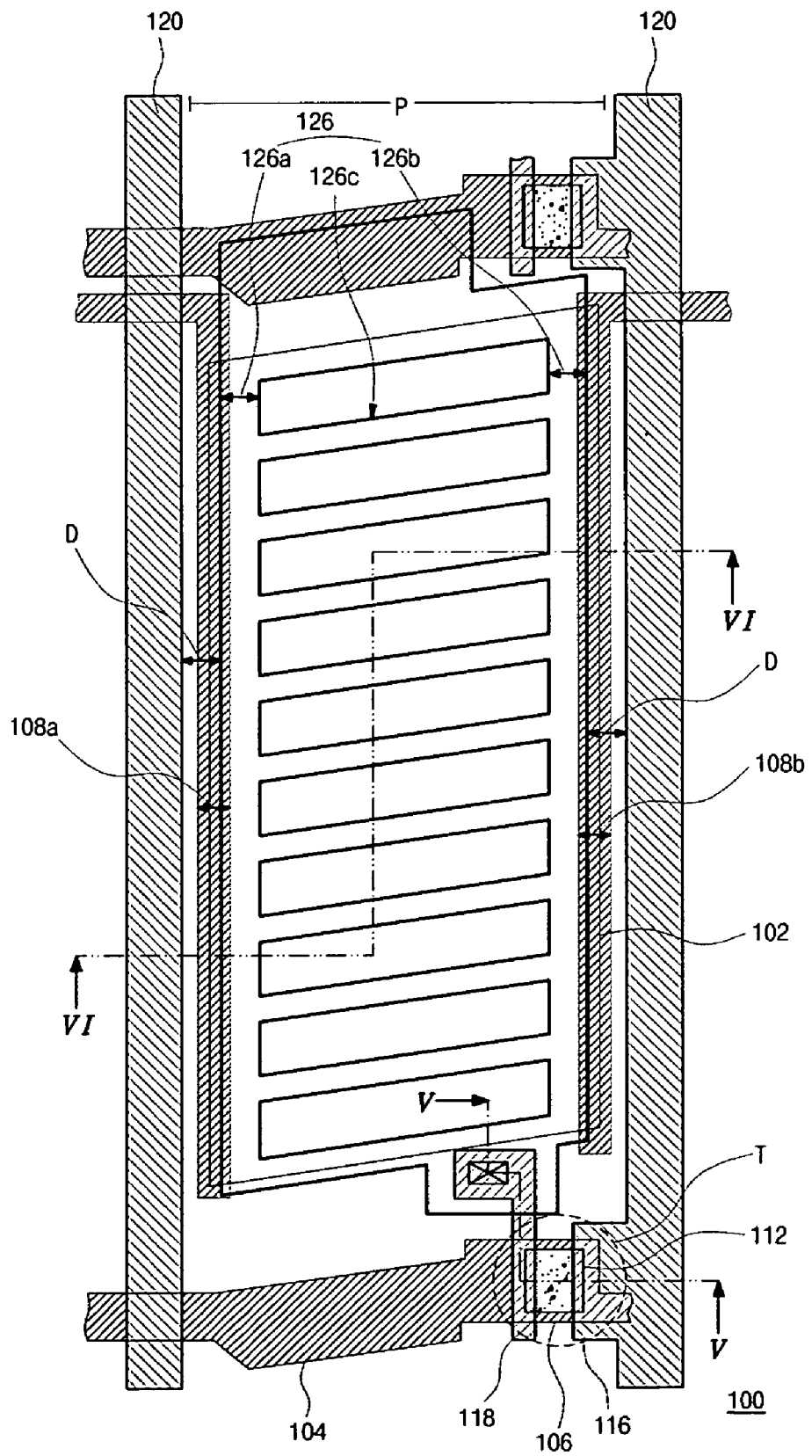
FIG. 5 is a plane view of an array substrate for an IPS-mode LCD device according to a first exemplary embodiment of the present invention.

FIG. 5 is a plane view of an array substrate for an IPS-mode LCD device according to a first exemplary embodiment of the present invention. The IPS-mode LCD device according to a first exemplary embodiment of the present invention includes an insulating layer of a low dielectric constant between the pixel and common electrodes to resolve the problem of storage capacity in the related art.

As shown in FIG. 5, the gate and data lines 104 and 120 are formed on the substrate 100. The gate and data lines 104 and 120 cross each other to define the pixel region P. The TFT T is connected to the gate and data lines 104 and 120. The TFT T includes the gate electrode 106, the semiconductor layer 112, the source electrode 116 and the drain electrode 118. The common electrode 102 and the pixel electrode 126 are formed on the substrate 100 in the pixel region P. The common and pixel electrode 102 and 126 are plate shaped and bar shaped, respectively. The pixel electrode 102 includes first and second portions 126a and 126b and a plurality of third portions 126c. The first and second portions 126a and 126b are substantially parallel to the data line 120. The first and second portions 126a and 126b are parallel to and separated from each other. The plurality of third portions 126c connect to the first and second portions 126a and 126b. The plurality of third portions 126c are parallel to one another and have an angle of 0 degree to 45 degree with respect to the gate line 104. In other words, the plurality of third portions 126c is oblique to the first and second portions 126a and 126b. The plurality of third portions 126c are arranged as closed to each other as possible so that the electric field between the common and pixel electrodes 102 and 126 drives the liquid crystal molecules on the pixel electrode 126. The third pixel electrode 126c in one pixel region P may be symmetric with the third pixel electrode 126c in another pixel region P which is next to the one pixel region P. The viewing angles in upper and lower sides and a diagonal direction are improved by the above mentioned structure.

First and second metal patterns 108a and 108b are formed on both ends of the common electrode 102. The first and second metal patterns 108a and 108b are parallel to the data line 120. In other words, the first and second metal patterns 108a and 108b are parallel to the first and second portions 126a and 126b. The first metal pattern 108a in one pixel region P and the second metal pattern 108b in another pixel region, which is next to the one pixel region P, are integrated each other. The resistance of the common electrode 102 is reduced by the first and second metal patterns 108a and 108b. Moreover, the first and second metal patterns 108a and 108b block leakage light. The liquid crystal molecules in a light leakage region D next to the common electrode 102 are irregularly arranged such that undesired images are displayed in the light leakage region D. The first and second metal patterns 108a and 108b is capable of preventing the above problem.

Moreover, a margin of forming a black matrix (not shown) on an upper substrate (not shown) is decreased due to the first and second metal patterns 108a and 108b. In more detail, when the black matrix (not shown) is formed to correspond to the light leakage region D, the margin is required for misalignment. The larger the margin, the less aperture ratio the device has. The first and second metal patterns 108a and 108b decrease the margin such that the aperture ratio is improved.

The gate insulating layer (not shown) between the common and pixel electrodes 102 and 126 has a low dielectric constant. The dielectric constant of the gate insulating layer (not shown) in the present invention may be about 3 to 4. The storage capacity between the common and pixel electrodes 102 and 126 is reduced by the gate insulating layer having the dielectric constant. Moreover, since the storage capacity between the common and pixel electrodes 102 and 126, the size of the TFT T is reduced.

FIGS. 6A to 6G are cross-sectional views showing a process of fabricating a portion taken along the line V-V of FIG. 5, and FIGS. 7A to 7G are cross-sectional views showing a process of fabricating a portion taken along the line VI-VI of FIG. 5.

Figure 6A:
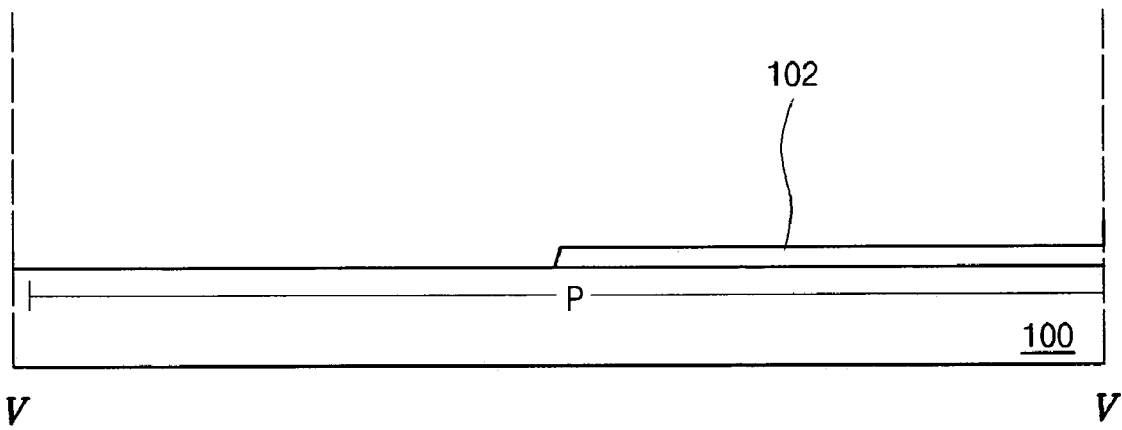
FIGS. 6A to 6G are cross-sectional views showing a process of fabricating a portion taken along the line V-V of FIG. 5.
Figure 7A:
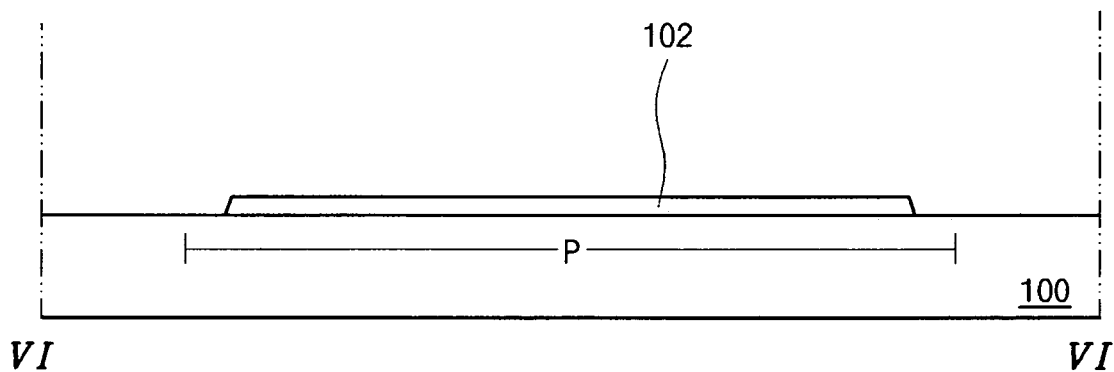
FIGS. 7A to 7G are cross-sectional views showing a process of fabricating a portion taken along the line VI-VI of FIG. 5.

A first mask process is described in FIGS. 6A and 7A. The common electrode 102 is formed on the substrate 100 in the pixel region P by depositing and pattering a transparent conductive material using a first mask (not shown). The transparent conductive material includes one of indium-tin-oxide (ITO) and indium-zinc-oxide (IZO).

Figure 6B:
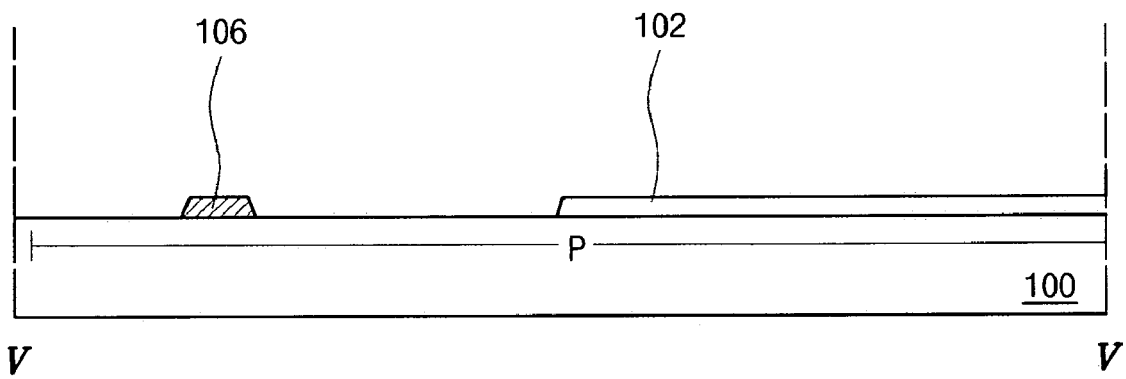
Figure 7B:
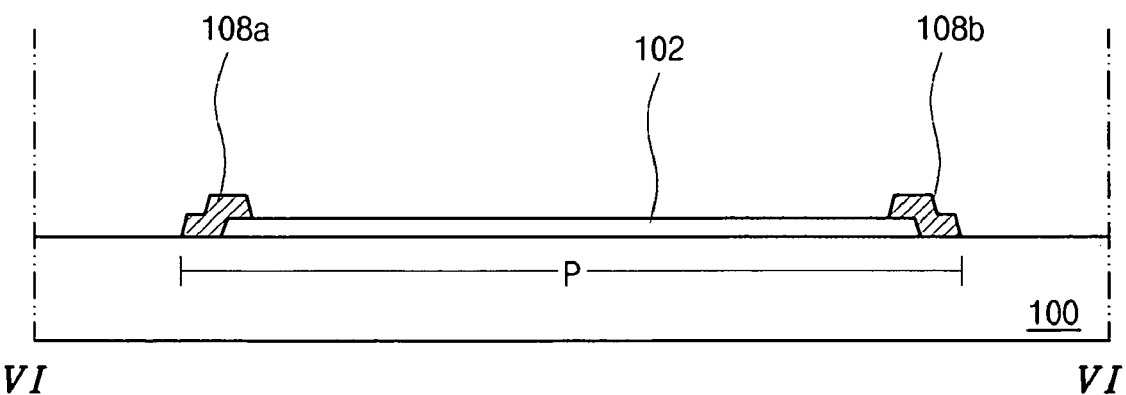

A second mask process is described in FIGS. 6B and 7B. The gate line 104 (of FIG. 5) is formed on the substrate 100 including the common electrode 102 by depositing and pattering a first metallic material using a second mask (not shown). The first metallic material includes at least one of aluminum (Al), aluminum alloy (AlNd), tungsten (W), copper (Cu), Molybdenum (Mo), Chromium (Cr), moly-tungsten (MoW). The gate line 104 (of FIG. 5) may functions as the gate electrode 106. The gate electrode 106 may extend from the gate line 104. At the same time, the first and second metal patterns 108a and 108b are formed on both sides of the common electrode 102. The first and second metal patterns 108a and 108b may be perpendicular to the gate line 104 (FIG. 5).

Figure 6C:
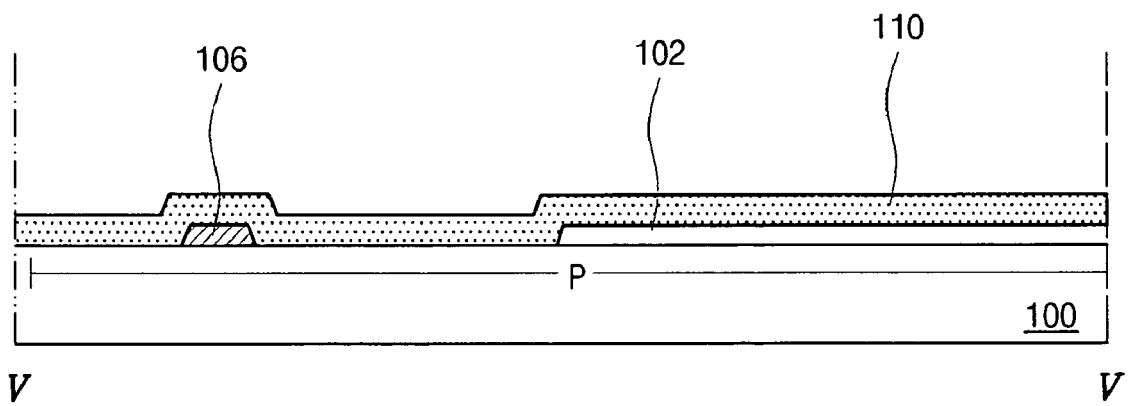
Figure 7C:
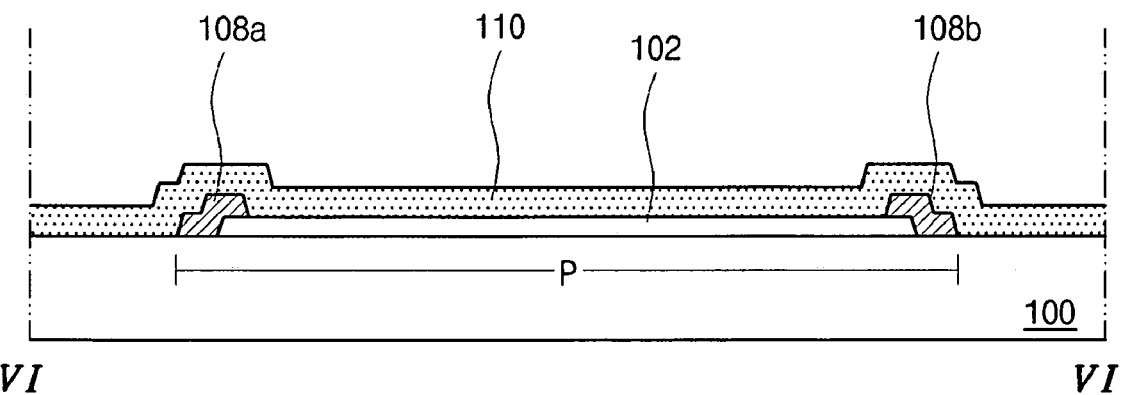

Next, as shown in FIGS. 6C and 7C, the gate insulating layer 110 is formed on the gate line 104 (FIG. 5), the gate electrode 106, the common electrode 102 and the first and second metal patterns 108a and 108b by depositing an insulating material. The insulating material has the low dielectric constant between about 3 and about 4. For example, silicon oxide ($SiO_2$), benzocyclobutene (BCB) and acrylic resin may be used for the gate insulating layer 110. Silicon oxide ($SiO_2$) has dielectric constant of about 3.4. The electric constant of the gate insulating layer may be less than 3. When the gate insulating layer has the dielectric constant between 3 and 4, the storage capacity between the common and pixel electrodes 102 and 126 has a quarter of the storage capacity of device in the related art. The LCD device in the related art includes the gate insulating layer of silicon nitride (SiNx). Since the storage capacity of IPS mode LCD device according to the present invention is reduced, the TFT T is capable of having a small size and the aperture ratio is improved.

Figure 6D:
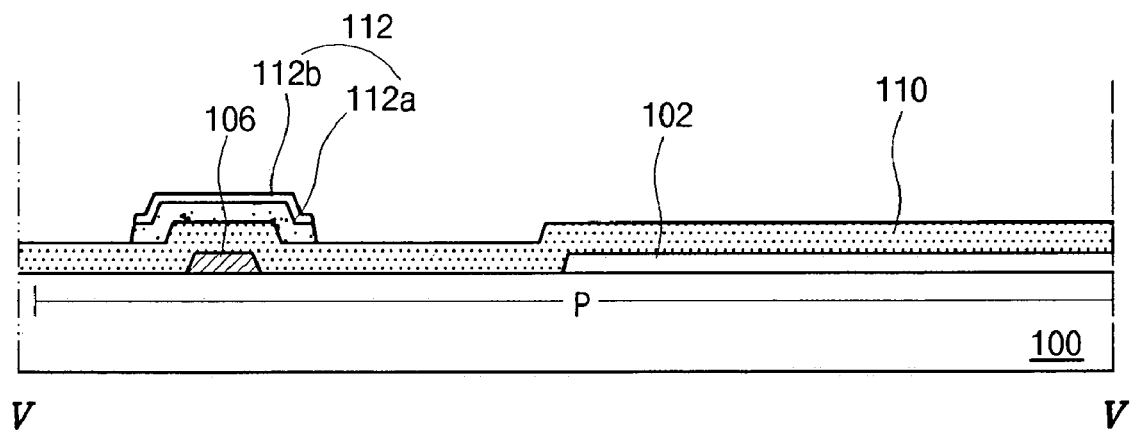
Figure 7D:
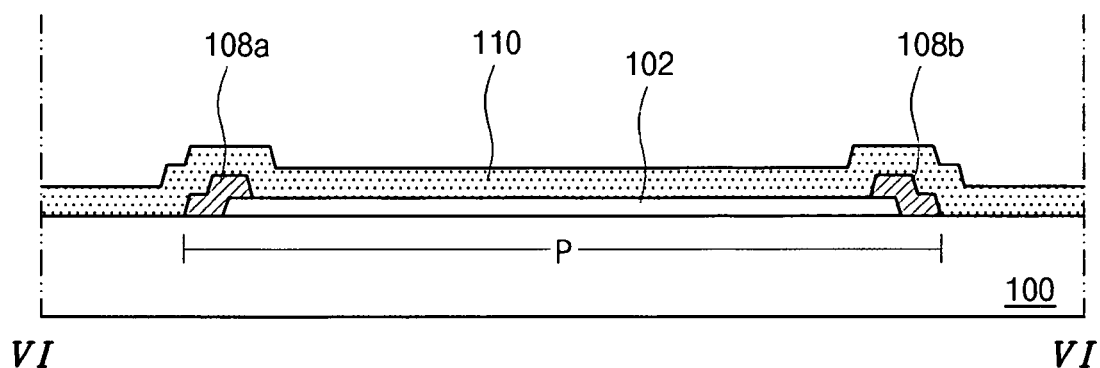

A third mask process is described in FIGS. 6D and 7D. As shown in FIGS. 6D and 7D, the semiconductor layer 112 including the active layer 112a and the ohmic contact layer 112b on the gate insulating layer 110 is formed by sequentially depositing and patterning intrinsic amorphous silicon (a-Si:H) and impurity-doped amorphous silicon (n+a-Si:H) using a third mask (not shown). The semiconductor layer 112 corresponds to the gate electrode 106.

Figure 6E:
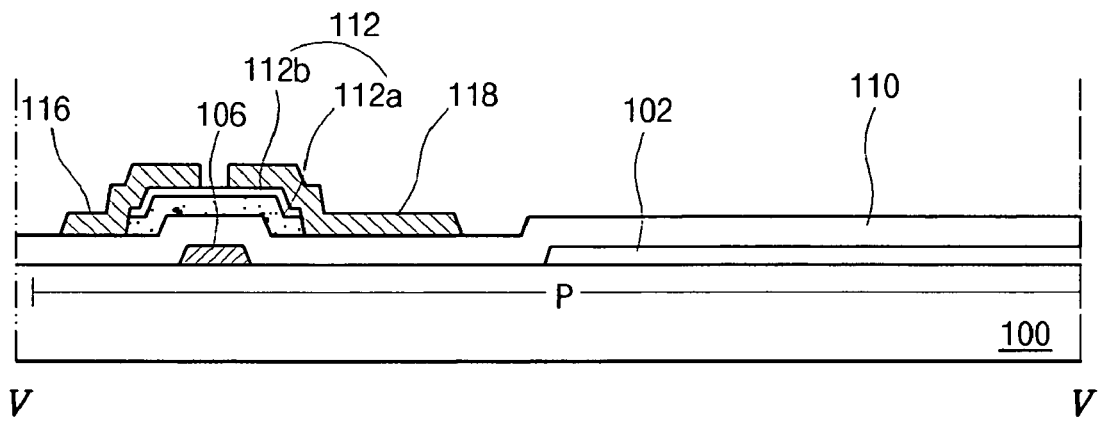
Figure 7E:
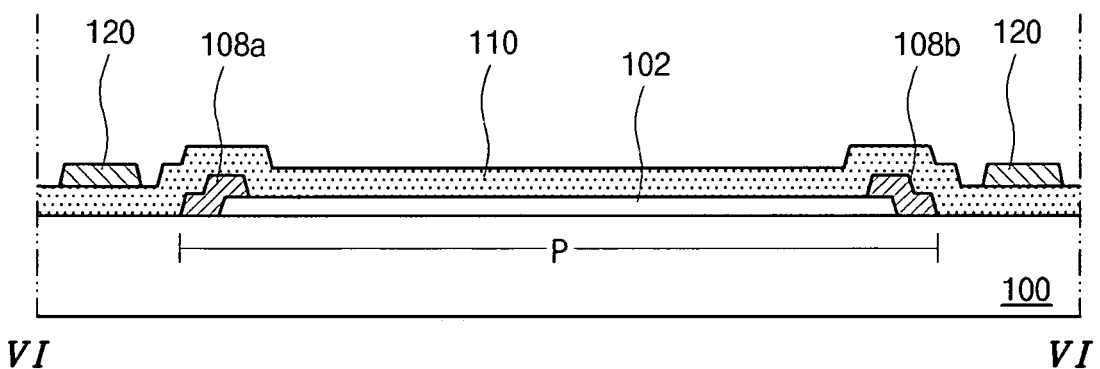

A fourth mask process is described in FIGS. 6E and 7E. As shown in FIGS. 6E and 7E, the source and drain electrodes 116 and 118, which are separated from each other, are formed on the semiconductor layer 112 by depositing and patterning a second metallic material using a fourth mask (not shown). The second metallic material may include at least one of aluminum (Al), aluminum alloy (AlNd), tungsten (W), copper (Cu), Molybdenum (Mo), Chromium (Cr), moly-tungsten (MoW). At the same time, the data line 120 is formed on the gate insulating layer 110. The data line 120 extends from the source electrode 116 and crosses the gate line 104 (of FIG. 5) to define the pixel region P.

Figure 6F:
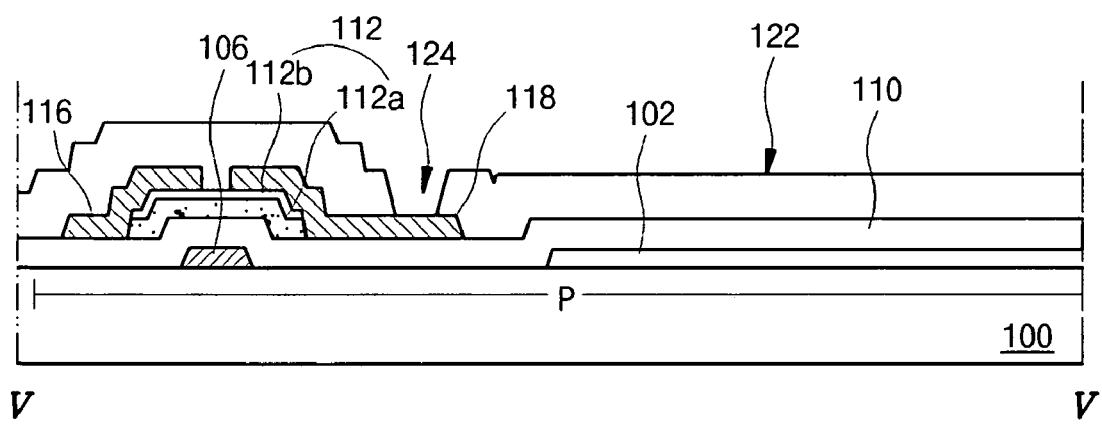
Figure 7F:
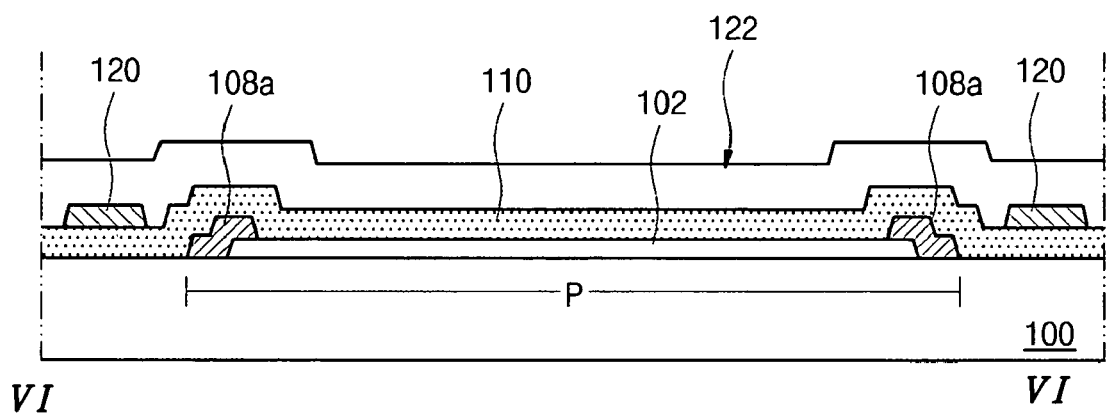

A fifth mask process is described in FIGS. 6F and 7F. As shown in FIGS. 6F and 7F, the passivation layer 122, which includes a drain contact hole 124, is formed on the source and drain electrodes 116 and 118 and the data line 120 by depositing and patterning one of an inorganic insulating material and an organic insulating material using a fifth mask process. The inorganic insulating material and the organic insulating material include a low dielectric constant. The drain contact hole 124 exposes the drain electrode 118.

Figure 6G:
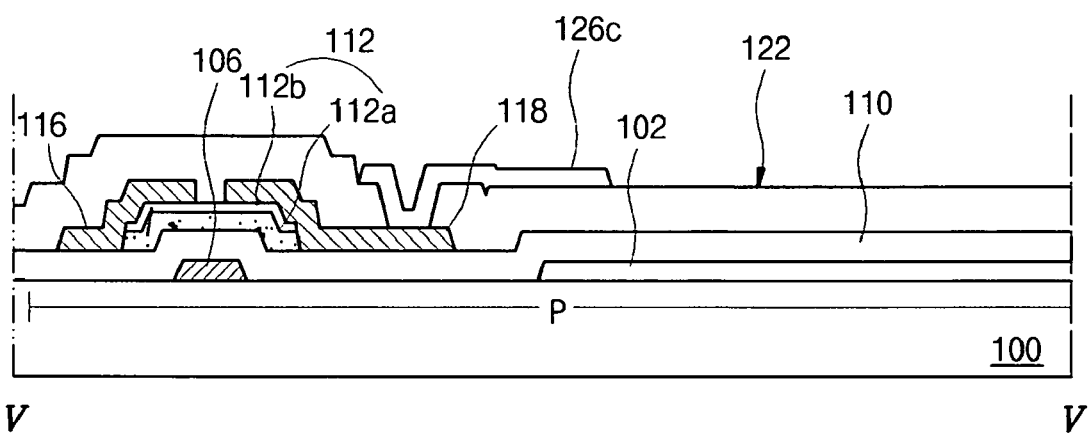
Figure 7G:
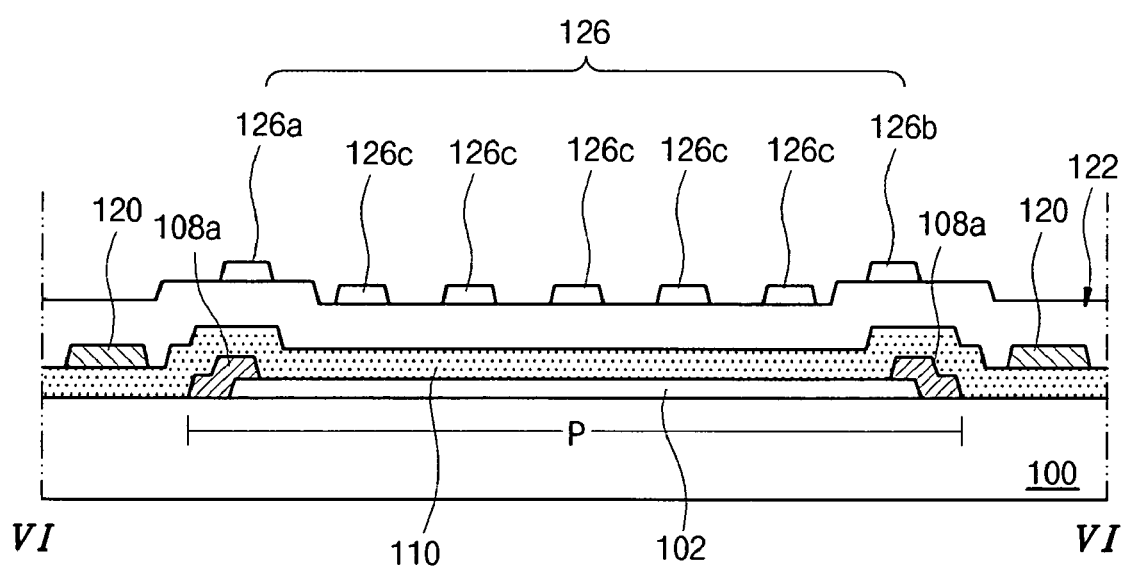

A sixth mask process is described in FIGS. 6G and 7G. As shown in FIGS. 6G and 7G, a pixel electrode 126 is formed on the passivation layer 122 by depositing and patterning a transparent conductive material using a sixth mask (not shown). The transparent conductive material may include one of ITO and IZO. The pixel electrode 126 is connected to the drain electrode 118 through the drain contact hole 124.

The pixel electrode 126 includes the first and second portions 126a and 126b and the plurality of third portions 126c. The first and second portions 126a and 126b are parallel to the data line and separated from each other. In other words, the first and second portions 126a and 126b are perpendicular to the gate line 104 (FIG. 5). The plurality of third portions 126c connect to the first and second portions 126a and 126b. The plurality of third portions 126c are parallel to one another and have an angle of 0 degree to 45 degree with respect to the gate line 104. In other words, the plurality of third portions 126c is oblique to the first and second portions 126a and 126b. The third pixel electrode 126c in one pixel region P may be symmetric with the third pixel electrode 126c in another pixel region P which is next to the one pixel region P.

The array substrate for the IPS mode LCD device according to the first exemplary embodiment of the present invention is manufactured by the above-mentioned processes. Since the array substrate includes the gate insulating layer 110 of a low dielectric constant, the storage capacity between the common and pixel electrodes 102 and 126 is reduced. Since the TFT has a small size, the aperture ratio is improved. Moreover, since the pixel electrode 126 is parallel to and oblique to the data line 120, the IPS mode LCD device has a wide viewing angle.

Figure 8:
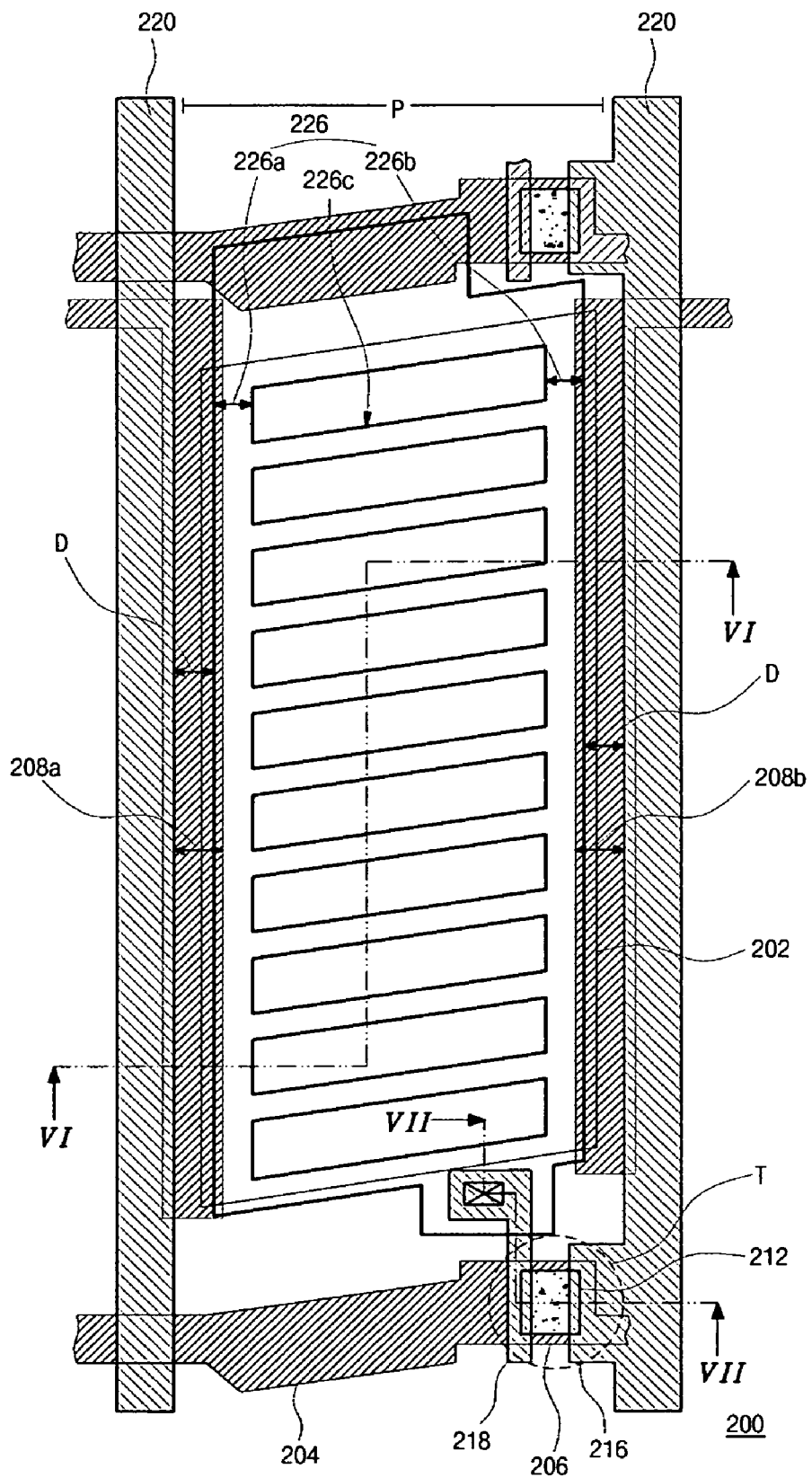
FIG. 8 is a plane view of an array substrate for an IPS-mode LCD device according to a second exemplary embodiment of the present invention.

FIG. 8 is a plane view of an array substrate for an IPS-mode LCD device according to a second exemplary embodiment of the present invention. The array substrate according to the second exemplary embodiment includes a metal pattern to block the light leakage region between the common electrode and data line.

As shown in FIG. 8, the gate and data lines 204 and 220, the TFT T, the common electrode 202, the first and second metal pattern 208a and 208b are formed on the substrate 200. The gate and data lines 204 and 220 cross each other such that the pixel region P is defined on the substrate 200. The TFT T is connected to the gate and data lines 204 and 220. The TFT T includes the gate electrode 206, the semiconductor layer 212, the source electrode 216 and the drain electrode 218. The common electrode 202 and the pixel electrode 226 are formed on the substrate 200 in the pixel region P. The common and pixel electrode 202 and 226 have the plate shape and the bar shape, respectively. The pixel electrode 202 includes first and second portions 226a and 226b and a plurality of third portions 226c. The first and second portions 226a and 226b are substantially parallel to the data line 220. The first and second portions 226a and 226b are parallel to and separated from each other. The plurality of third portions 226c connect to the first and second portions 226a and 226b. The plurality of third portions 226c are parallel to one another and have an angle of 0 degree to 45 degree with respect to the gate line 204. In other words, the plurality of third portions 226c are oblique to the first and second portions 226a and 226b. The plurality of third portions 226c are arranged as closed to each other as possible so that the electric field between the common and pixel electrodes 202 and 226 drives the liquid crystal molecules on the pixel electrode 226. The third pixel electrode 226c in one pixel region P may be symmetric with the third pixel electrode 226c in another pixel region P which is next to the one pixel region P. The viewing angles in upper and lower sides and a diagonal direction are improved by the above mentioned structure.

The first and second metal patterns 208a and 208b are formed in the light leakage region D. The light leakage region D corresponds to between the common electrode 202 and the data line 220. Each of the first and second metal patterns 208a and 208b overlaps the common electrode 202 and the data line 220 such that the light leakage region D is fully covered with the first and second metal patterns 208a and 208b. The first and second metal patterns 208a and 208b are parallel to the data line 220. In other words, the first and second metal patterns 208a and 208b are parallel to the first and second portions 226a and 226b. The first metal pattern 208a in one pixel region P and the second metal pattern 208b in another pixel region, which is next to the one pixel region P, are integrated each other. The resistance of the common electrode 202 is reduced by the first and second metal patterns 208a and 208b. Moreover, the first and second metal patterns 208a and 208b block leakage light in the light leakage region D such that the IPS-LCD device does not require the black matrix (not shown). Without the black matrix, the aperture ratio is improved.

Since the data line 220 overlaps the first and second metal patterns 208a and 208b, an organic insulating layer (not shown) is formed between the data line 220 and the first metal pattern 220a and between the data line 220 and the second metal pattern 220b to prevent a voltage in the first and second metal patterns 208a and 208b affecting the data line 220. The organic insulating layer (not shown) has a low dielectric constant.

Figure 9A:
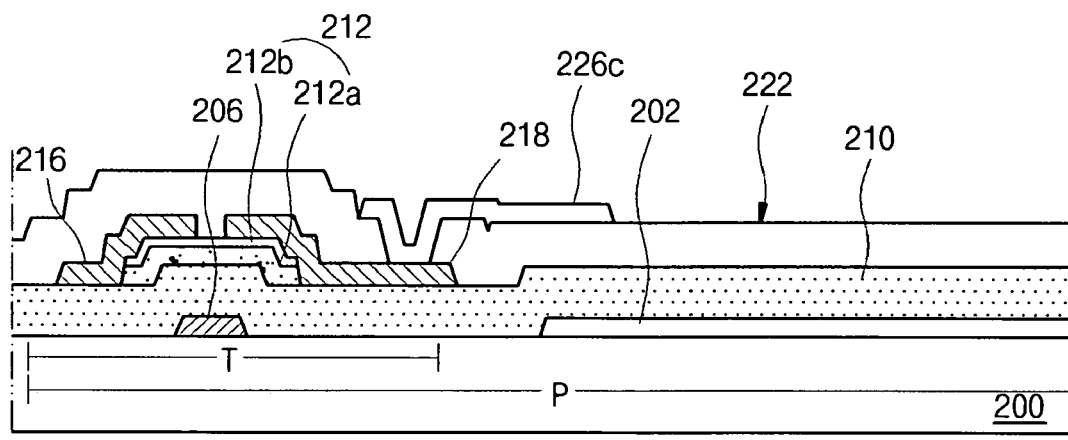
FIGS. 9A and 9B are cross-sectional views taken along the lines VII-VII and VIII-VIII, respectively.
Figure 9B:
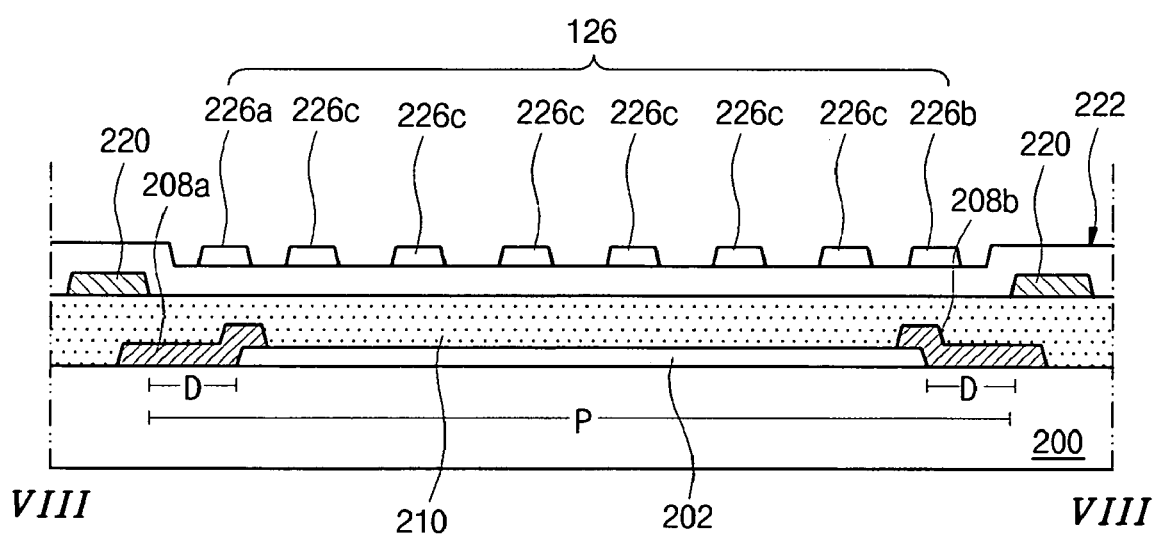

FIGS. 9A and 9B are cross-sectional views taken along the lines VII-VII and VIII-VIII, respectively.

As shown in FIGS. 9A and 9B, the gate and data lines 204 (of FIG. 8) and 220 cross each other such that the pixel region P is defined on the substrate 200. The TFT T is connected to the gate and data lines 204 (of FIG. 8) and 220. The TFT T includes the gate electrode 206, the gate insulating layer 210 on the gate electrode 206, the semiconductor layer 212 on the gate insulating layer 210, the source electrode 216 and the drain electrode 218 on the semiconductor layer 212. The gate electrode 206 and the source electrode 216 extend from the gate line 204 (of FIG. 8) and the data line 220, respectively. The source and drain electrodes 216 and 218 are separated from each other. The semiconductor layer 212 includes the active layer 212a and the ohmic contact layer 212b.

The common electrode 202 of a transparent conductive material is formed on the substrate 200. The common electrode 202 is plate shaped. The pixel electrode 226, which includes the first and second portions 226a and 226b and the plurality of third portions 226c, is formed over the common electrode 202. The gate insulating layer 210 and the passivation layer 222 are sequentially disposed between the common and pixel electrodes 202 and 226.

Moreover, the first and second metal patterns 208a and 208b are formed the light leakage region D. As mentioned above, the light leakage region D corresponds to the region between the common electrode 202 and the data line 220. The first and second metal patterns 208a and 208b contacts the common electrode 202 and overlaps the data line 220. The leakage light in the light leakage region D is fully blocked by the first and second metal patterns 208a and 208b. To prevent the first and second metal patterns 208a and 208b affecting the data line 220, the gate insulating layer 210, which is disposed between the first metal pattern 208a and the data line 220 and between the second metal pattern 208b and the data line 220, is formed of an insulating material having a low dielectric constant less than 3. The insulating material may include one of BCB and acrylic resin.

The array substrate according to the second exemplary embodiment of the present invention is fabricated by a same process as described above with respect to the first embodiment.

Figure 10:
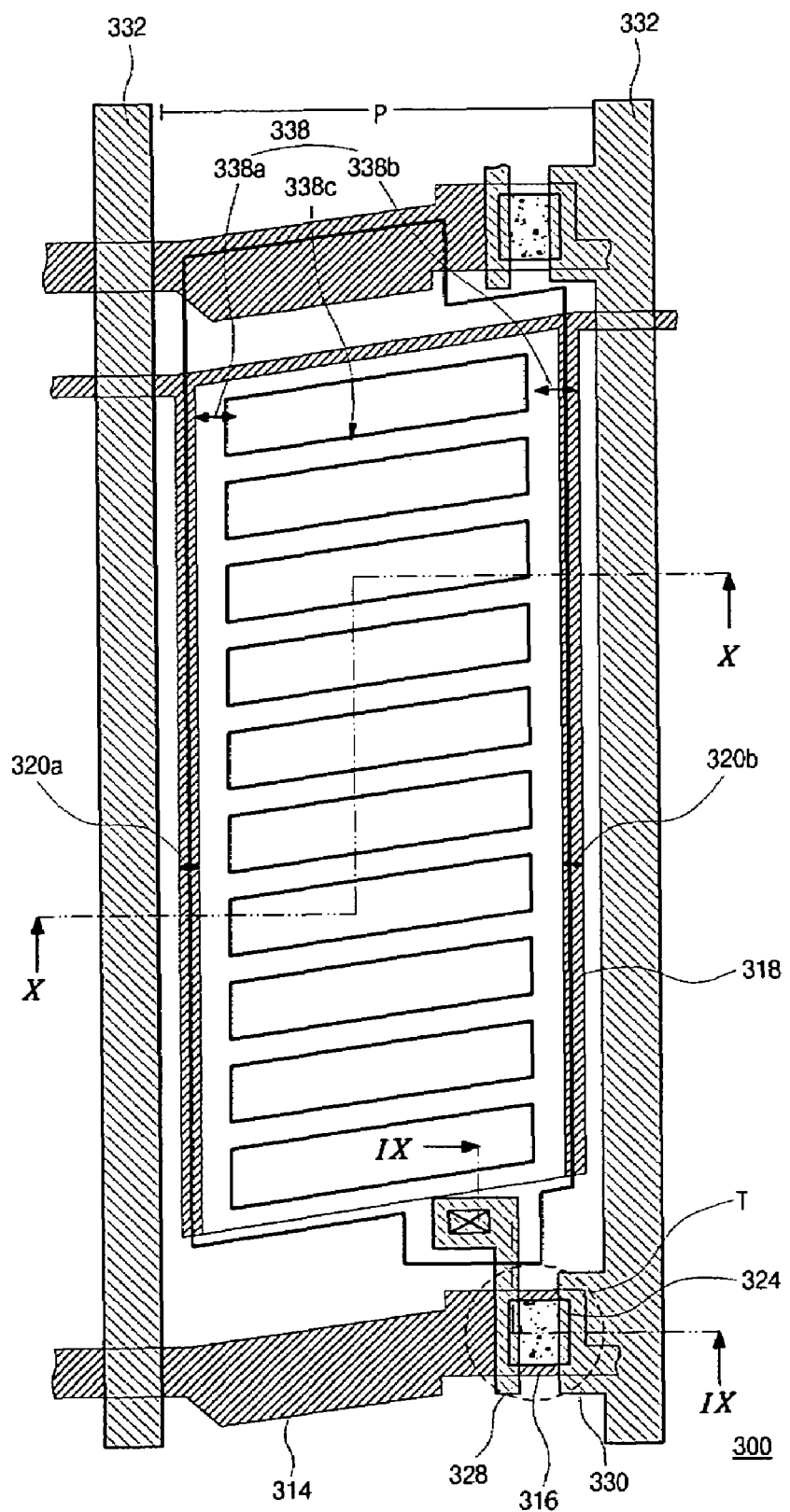
FIG. 10 is a plane view of an array substrate for an IPS-mode LCD device according to a third exemplary embodiment of the present invention.

FIG. 10 is a plane view of an array substrate for an IPS-mode LCD device according to a third exemplary embodiment of the present invention. The array substrate according to the third exemplary embodiment is fabricated by a process using fewer masks than the first and second exemplary embodiments. Moreover, a phenomenon of reverse taper, which occurs when laminated metal layers are simultaneously patterned, is prevented in the third exemplary embodiment.

As shown in FIG. 10, the gate and data lines 314 and 332 are aligned on the substrate 300. The gate and data lines 314 and 332 cross each other such that the pixel region P is defined on the substrate 300. The TFT T is connected to the gate and data lines 314 and 332. The TFT T includes the gate electrode 316, the semiconductor layer 324, the source electrode 328 and the drain electrode 330. The common electrode 318 and the pixel electrode 338 are formed on the substrate 300 in the pixel region P. The common and pixel electrode 102 and 126 are plate shaped and bar shaped, respectively. The pixel electrode 338 includes the first and second portions 338a and 338b and the plurality of third portions 338c. The first and second portions 338a and 338b are substantially parallel to the data line 332. The first and second portions 338a and 338b are parallel to and separated from each other. The plurality of third portions 338c connect to the first and second portions 338a and 338b. The plurality of third portions 338c are parallel to one another and have an angle of 0 degree to 45 degree with respect to the gate line 314. In other words, the plurality of third portions 338c are oblique to the first and second portions 338a and 338b. The plurality of third portions 338c are arranged as close to each other as possible so that the electric field between the common and pixel electrodes 318 and 338 drives the liquid crystal molecules on the pixel electrode 338. The third pixel electrode 338c in one pixel region P may be symmetric with the third pixel electrode 338c in another pixel region P, which is next to the one pixel region P. The viewing angles in upper and lower sides and a diagonal direction are improved by the above mentioned structure.

The array substrate according to the third exemplary embodiment is fabricated by a fifth mask process by forming the common electrode 318, the gate line 314 and the gate electrode 316 using a same mask (not shown). At the same time, the first and second metal patterns 320a and 320b are formed at both ends of the common electrode 318 to reduce a resistance of the common electrode 318. The first metal pattern 320a in one pixel region P is integrated the second metal pattern 320b in another pixel region P, which is next to the one pixel region P, such that a common voltage is applied into the common electrode 318 in different pixel regions P. A fabricating process of the array substrate according to the third exemplary embodiment is described in FIGS. 11A to 11J and FIGS. 12A to 12J.

FIGS. 11A to 11J are cross-sectional views showing a process of fabricating a portion taken along the line IX-IX of FIG. 10, and FIGS. 12A to 12J are cross-sectional views showing a process of fabricating a portion taken along the line X-X of FIG. 10.

A first mask process is described by FIGS. 11A to 11F and FIGS. 12A to 12F.

Figure 11A:
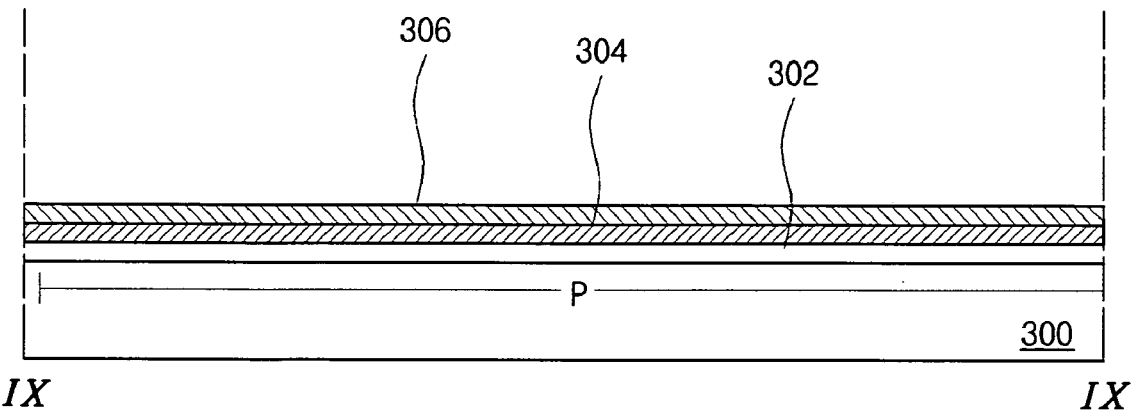
FIGS. 11A to 11J are cross-sectional views showing a process of fabricating a portion taken along the line IX-IX of FIG. 10.
Figure 12A:
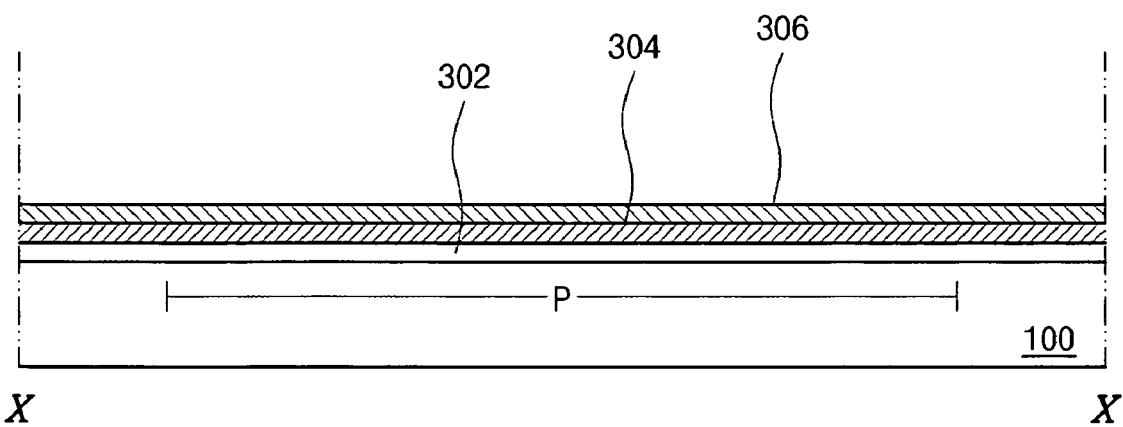
FIGS. 12A to 12J are cross-sectional views showing a process of fabricating a portion taken along the line X-X of FIG. 10.

As shown in FIGS. 11A and 12A, a transparent conductive material layer 302, a first metallic material layer 304 and a second metallic material layer 306 are formed on the substrate 300 by sequentially depositing a transparent conductive material, a first metallic material and a second metallic material. The transparent conductive material may include one of ITO and IZO. The first metallic material may be Mo. The second metallic material may be AlNd.

Figure 11B:
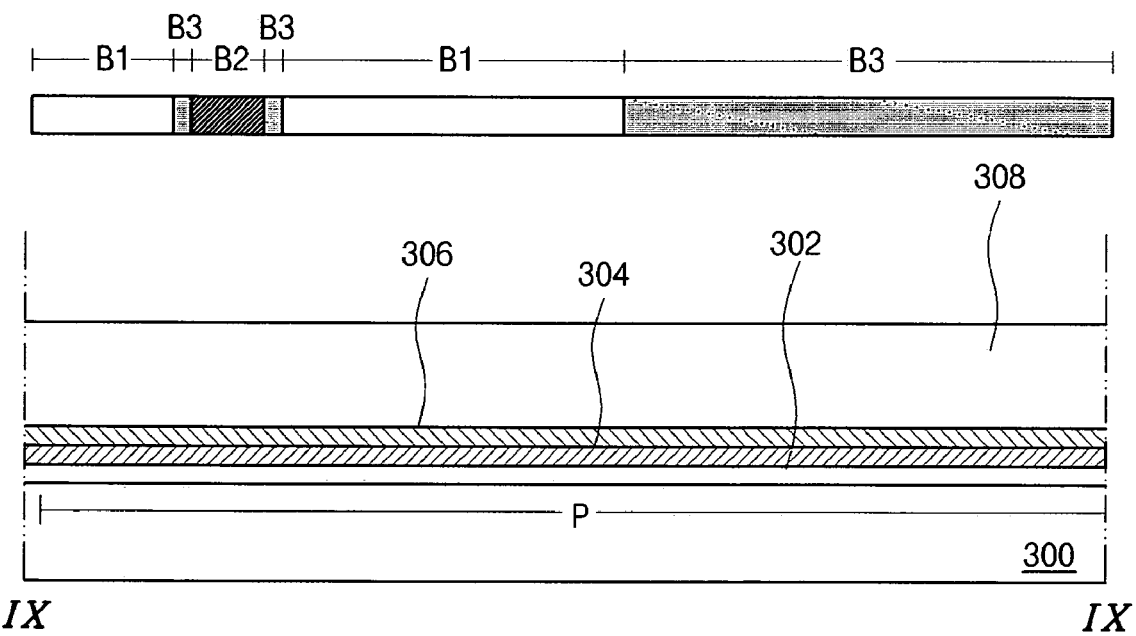
Figure 12B:
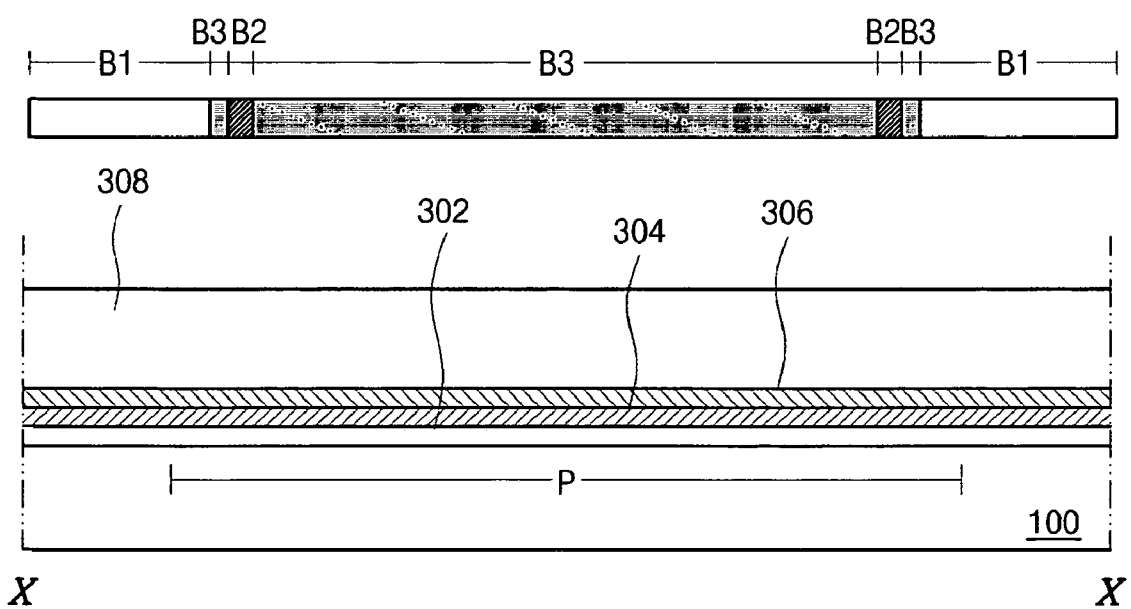

Next, as shown in FIGS. 11B and 12B, a photoresist (PR) layer 308 is formed on the second metallic material layer 306 by coating a PR. Then, a first mask M, which includes a transmissive area B1, a blocking area B2 and a half-transmissive area B3, is disposed over the PR layer 308. The half-transmissive area B3 has a transmittance less than the transmissive area B1 and greater than the blocking area B2. The half-transmissive area B3 may be formed of one of an opaque layer and a slit shape. When the PR layer 308 is exposed using the first mask M, the PR layer 308 corresponding to the half-transmissive area B3 is less exposed than the PR layer 308 corresponding to the transmissive area B1 and much exposed than the PR layer 308 corresponding to the blocking area B2. The blocking area B2 is disposed a region in which the gate electrode 316 (FIG. 10), the gate line 314 (FIG. 10) and the first and second metal patterns 320a (FIG. 10) and 320b (FIG. 10). Since the half-transmissive area B3 functions to prevent the phenomenon of reverse taper in the gate line 314 (FIG. 10) and the first and second metal patterns 320a (FIG. 10) and 320b (FIG. 10), the half-transmissive area B3 is disposed at both ends of the blocking area B2. Moreover, the half-transmissive area B3 is disposed in a region, in which the common electrode 318 (FIG. 10) is to be formed.

Next, the PR layer 308 is exposed and developed using the first mask M.

Figure 11C:
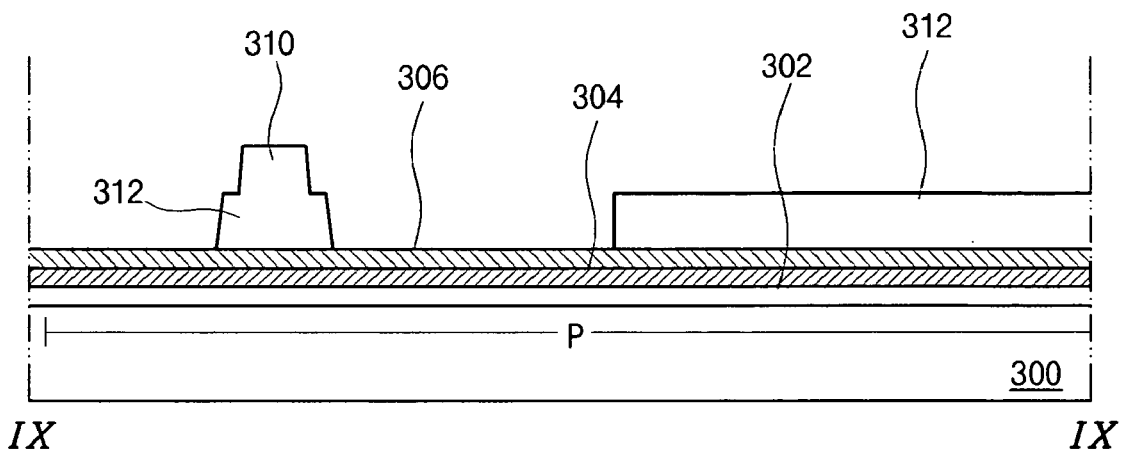
Figure 12C:
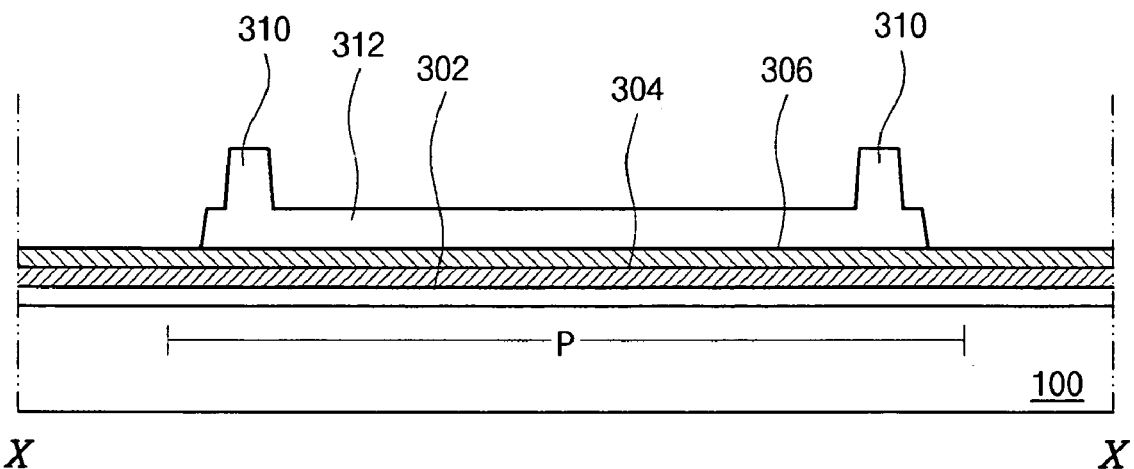

As shown in FIGS. 11C and 12C, first and second PR patterns 310 and 312, which have different height, are formed on the second metallic material layer 306. The first and second PR patterns 310 and 312 correspond to the blocking and half-transmissive area B2 and B3, respectively. The first PR pattern 310 is higher than the second PR pattern 312. The PR layer 308 corresponding to the transmissive area B1 is perfectly removed such that the second metallic material layer 306 corresponding to the transmissive area B1 is exposed between the first and second PR patterns 310 and 312.

Next, the exposed second metallic material layer 306 is removed using a first etchant. Sequentially, the first metallic material layer 304 and the transparent conductive material layer 302 are removed using the first etchant.

Figure 11D:
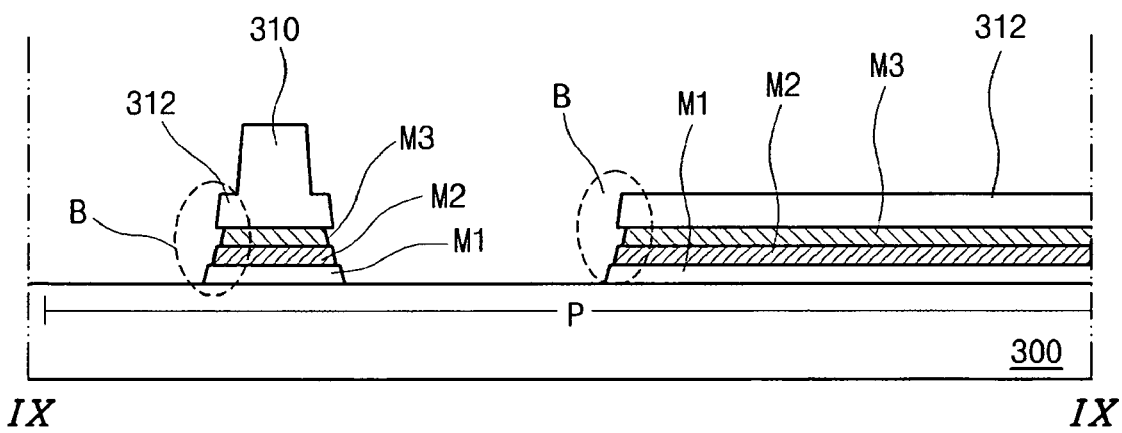
Figure 12D:
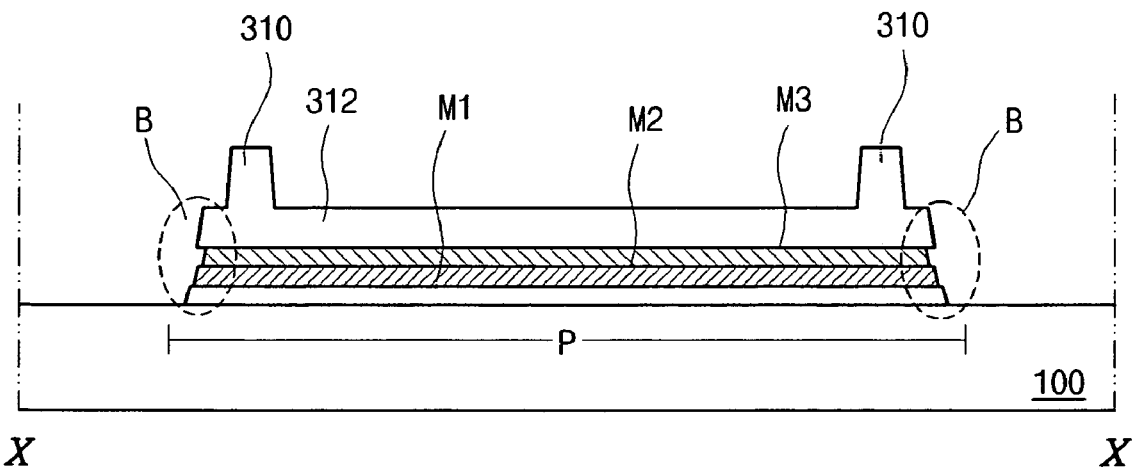

Thus, as shown in FIGS. 11D and 12D, a transparent conductive material pattern M1, a first metallic material pattern M2 and a second metallic material pattern M3 are formed between the substrate 300 and the first PR pattern 310 and between the substrate 300 and the second PR pattern 312. The transparent conductive material pattern M1, the first metallic material pattern M2 and the second metallic material pattern M3 corresponding to end portions B of the second PR pattern 312 have a tapered side shape. In other words, the first metallic material pattern M2 extrudes from the second metallic material pattern M3, and the transparent conductive material pattern M1 extrudes from the first metallic material pattern M2.

Figure 11E:
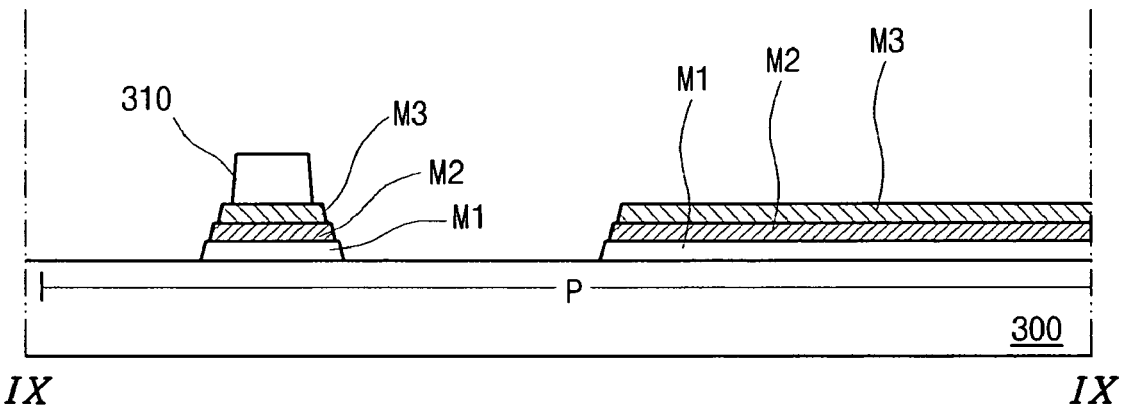
Figure 12E:
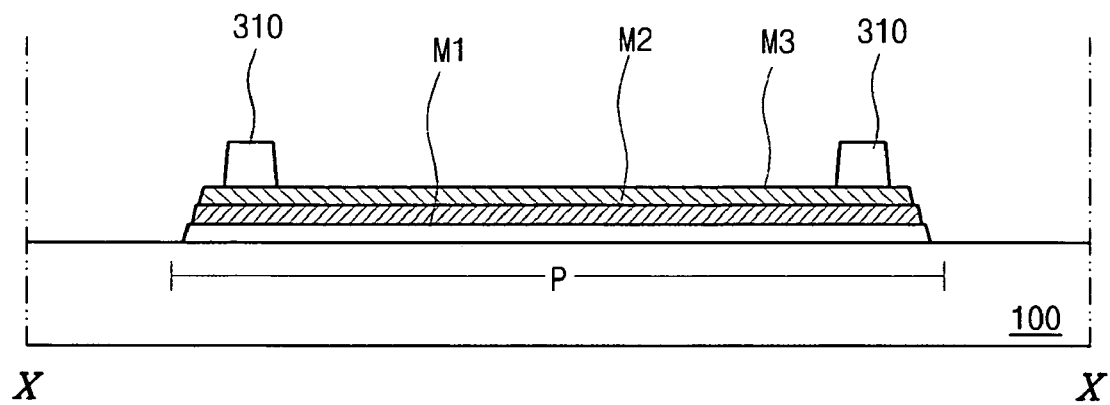

Next, as shown in FIGS. 11E and 12E, the first and second PR patterns 310 and 312 are ashed such that the first PR pattern 310 is partially removed and the second PR pattern 312 is perfectly removed. As a result, the second metallic material pattern M3 corresponding to the second PR pattern 312 is exposed.

Figure 11F:
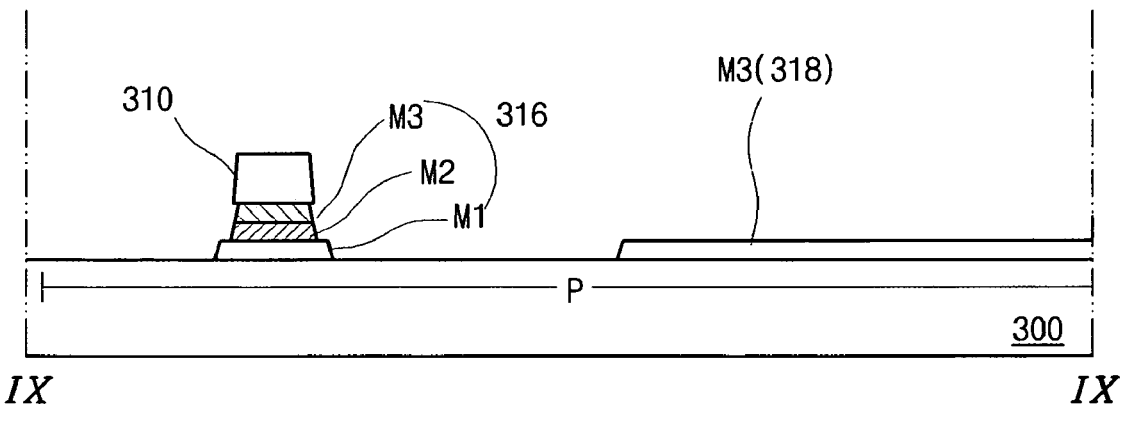
Figure 12F:
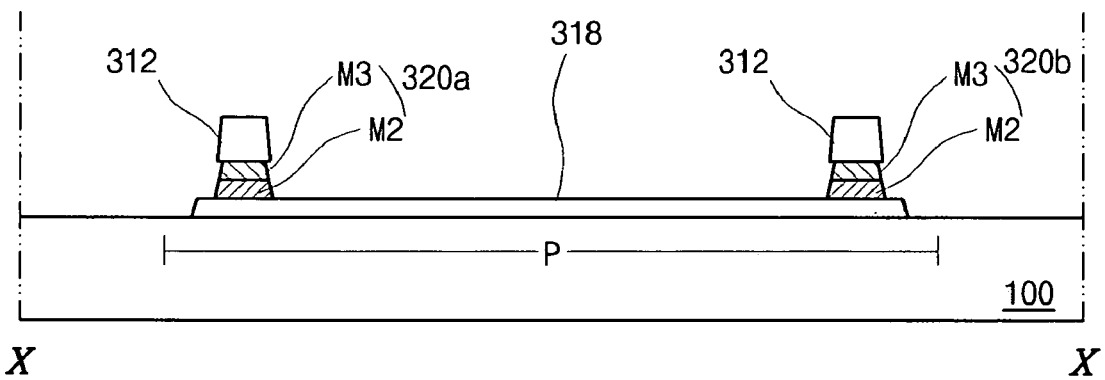

Next, as shown in FIGS. 11F and 12F, the exposed second metallic material pattern M3 and the first metallic material pattern M2 below the exposed second metallic material pattern M3 are removed using a second etchant. The second etchant is different from the first etchant such that the transparent conductive material pattern M1 is not removed. Moreover, the first metallic material pattern M2, which is formed of Mo, and the second metallic material pattern M3, which is formed of AlNd, has different etching ratio with regard to the second etchant. The first metallic material pattern M2 is much etched than the second metallic material pattern M3. However, since the first metallic material pattern M2 extrudes from the second metallic material pattern M3, the first and second metallic material patterns M2 and M3 may have a same end line.

When only one PR pattern is formed on the second metallic material layer M3 unlike the above-mentioned process, the transparent conductive material pattern M1 and the first and second metallic material patterns M2 and M3 have a same shape, not the tapered side shape. In this case, the first and second metallic material patterns M2 and M3 have the reverse tapered shape and are not on the same end line. When an insulating layer is formed on the first and second metallic material patterns having the reverse tapered shape, the insulating layer has defects. When the insulating layer is patterned, an etchant used for patterning may contact the gate line below the insulating layer through the defects such that the gate line may be damaged.

Since the first and second metallic material patterns M2 and M3 have the same end line, not the reverse tapered shape, the array substrate according to the third exemplary embodiment do not have the above-mentioned problems.

The transparent conductive material pattern M1, which is not covered with the first metallic material pattern M2, functions as the common electrode 318. The gate electrode 316 has a triple-layered structure including the transparent conductive material pattern M1 and the first and second metallic material patterns M2 and M3. Moreover, the first and second metal patterns 320a and 320b form both ends of the common electrode 318. The first and second metal patterns 320a and 320b have double-layered structures. At the same time, the gate line 314 (FIG. 10) is formed on the substrate 300. The gate line 314 (FIG. 10) has the same structure as the gate electrode 316. Then, the first PR pattern 310 is removed.

A contact hole is formed at an end of the gate line by partially removing the gate line in first mask process. In this case, when the gate line has the reverse-tapered shape, there is a problem of contact another metal layer with the gate line because of the reverse-tapered shape. However, since the gate line in the present embodiment has the tapered shape, the array substrate according to the present embodiment does not have the above-mentioned problem.

Figure 11G:
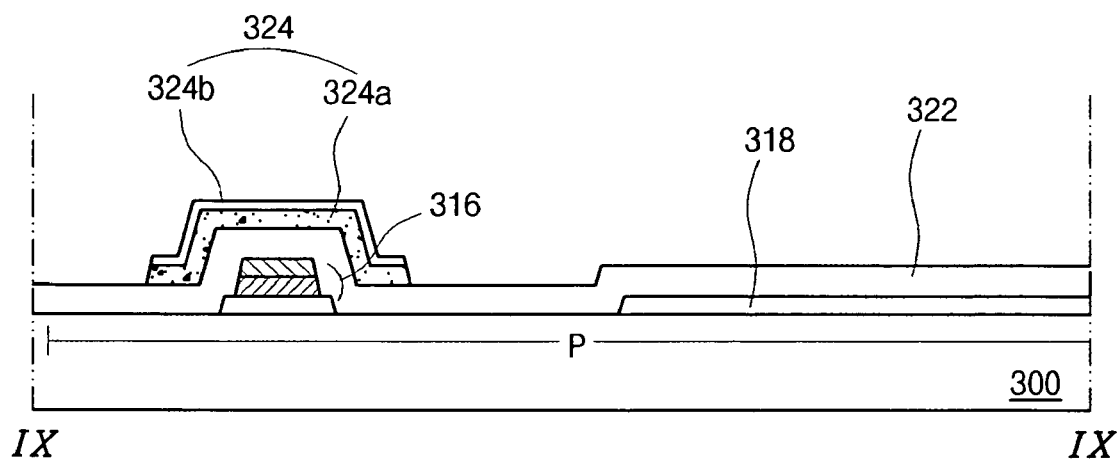
Figure 12G:
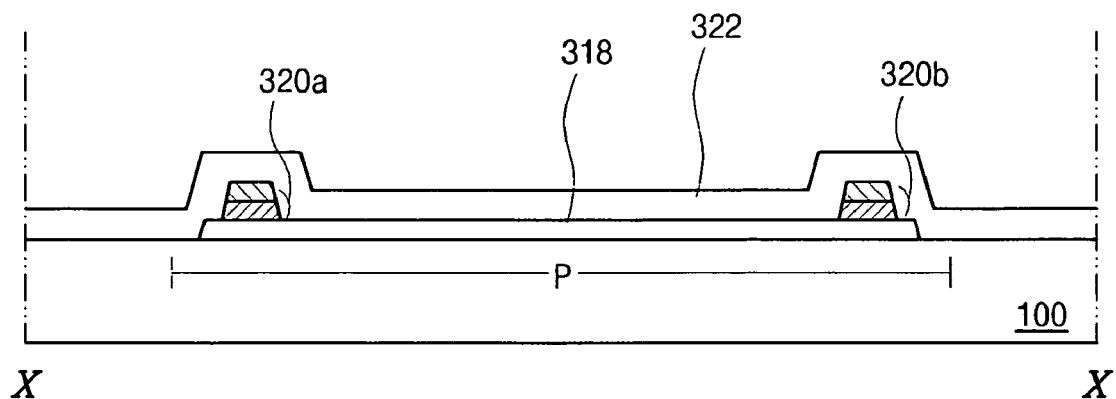

A second mask process is described in FIGS. 11G and 12G. As shown in FIGS. 11G and 12G, the gate insulating layer 322 is formed on the gate electrode 316 and the common electrode 318 by depositing a first insulating material of low dielectric constant. The first insulating material may include silicon oxide ($SiO_2$).

Next, the semiconductor layer 324, which includes the active layer 324a and the ohmic contact layer 324b, is formed on the gate insulating layer 322 by sequentially depositing and patterning intrinsic amorphous silicon (a-Si:H) and impurity-doped amorphous silicon (n+a-Si:H). The active layer 324a and the ohmic contact layer 324b are formed of intrinsic amorphous silicon (a-Si:H) and impurity-doped amorphous silicon (n+a-Si:H), respectively.

Figure 11H:
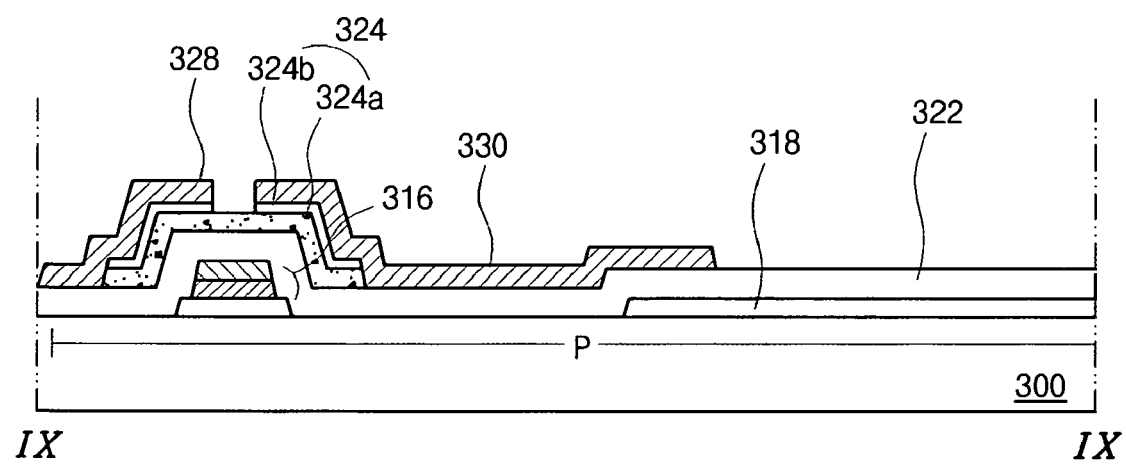
Figure 12H:
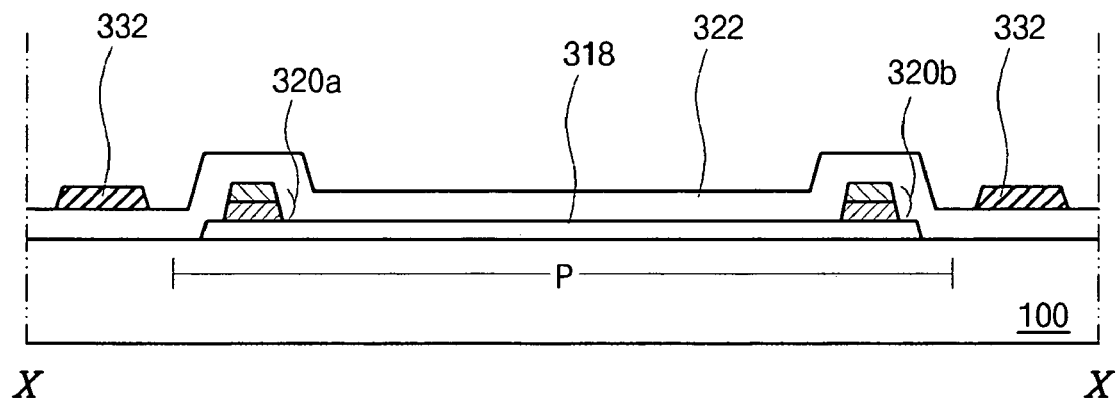

A third mask process is described in FIGS. 11H and 12H. As shown in FIGS. 11H and 12H, the source and drain electrodes 328 and 330 and the data line 332 are formed on the gate insulating layer 322 and the semiconductor layer 324 by depositing and patterning a third metallic material. The third metallic material includes at least one of Al, AlNd, Cr, Mo, MoW, W and Cu. The source and drain electrodes 328 and 330 are separated from each other, and the source electrode 328 extends from the data line 332. The data line 332 crosses the gate line 314 (FIG. 10) such that the pixel region P is defined.

Figure 11I:
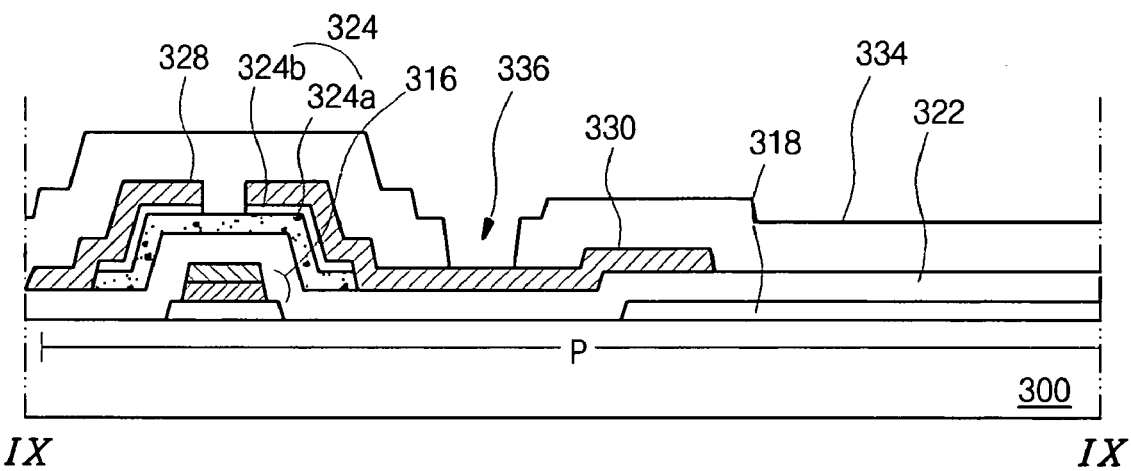
Figure 12I:
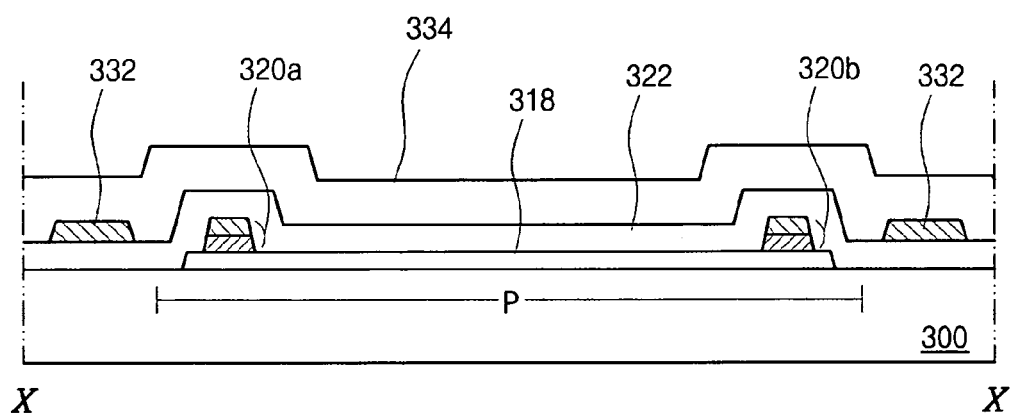

A fourth mask process is described in FIGS. 11I and 12I. As shown in FIGS. 11I and 12I, the passivation layer 334, including a drain contact hole 336, is formed on the source and drain electrodes 328 and 330 and the data line 332 by depositing and patterning a second insulating material of low dielectric constant. The second insulating may include $SiO_2$. The passivation layer 334 may be formed of an organic insulating material. The drain contact hole 336 exposes the drain electrode 330.

Figure 11J:
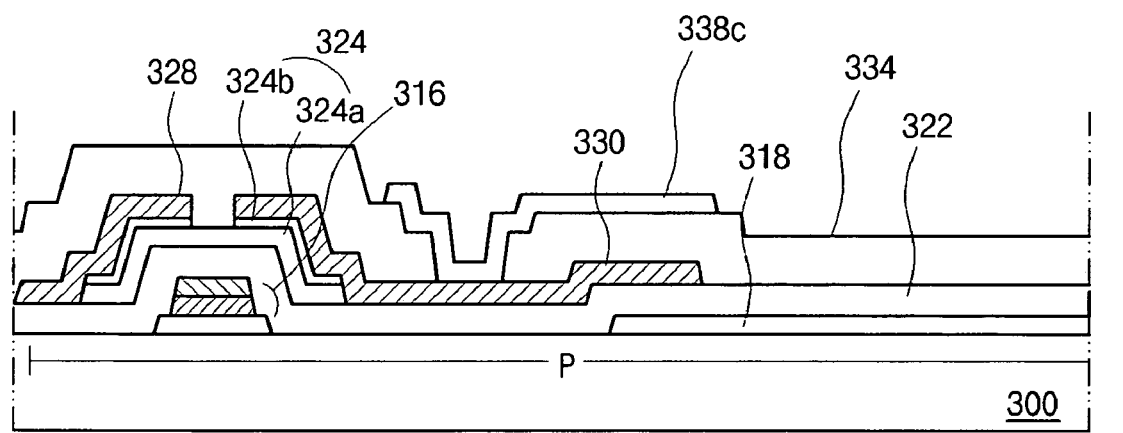
Figure 12J:
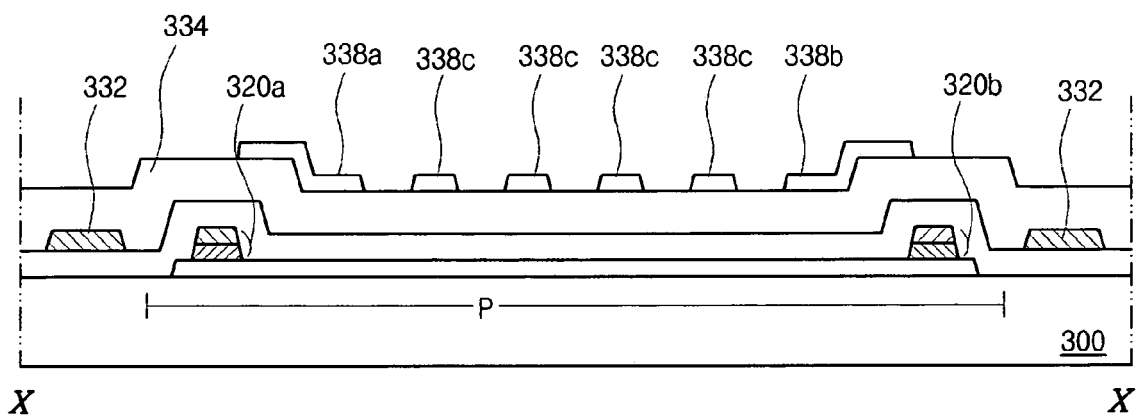

A fifth mask process is described in FIGS. 11J and 12J. As shown in FIGS. 11J and 12J, the pixel electrode 338 is formed on the passivation layer 334 by depositing and patterning a transparent conductive material. The transparent conductive material includes one of ITO and IZO. The pixel electrode 338 is connected to the drain electrode 330 through the drain contact hole 336. The pixel electrode 338 includes the first and second portions 338a and 338b and the plurality of third portions 338c. The first and second portions 338a and 338b are parallel to the data line 332 and separated from each other. The plurality of third portions 338c combine the first portion 338a with the second portion 338b. The plurality of third portions 338c have an angel between 0 degree and 45 degrees with regard to the gate line 314 (of FIG. 10).

The array substrate according to the third exemplary embodiment is fabricated by the above-mentioned five mask process.

What is claimed is:

1. An array substrate for an IPS mode LCD device, comprising:
   a substrate;
   a gate line along a first direction;
   a data line along a second direction;
   a TFT connected to the gate and data lines;
   a common electrode having a plate shape on the substrate and comprised of a first transparent conductive material;
   first and second metal patterns disposed between the common electrode and the data line;
   a pixel electrode comprised of a second transparent conductive material on the common electrode and including first and second portions and a plurality of third portions combining the first portion with the second portion, wherein the first and second portions are parallel to the second direction and separated from each other, and wherein the plurality of third portions are oblique to the first and second portions and separated from one another; and
   an insulating layer between the common and pixel electrodes, wherein the insulating layer has a dielectric constant between about 3 and about 4 and includes one of SiO2, benzocyclobutene (BCB) and acrylic resin.

2. The substrate according to claim 1, wherein the first and second metal patterns contact the common electrode.

3. The substrate according to claim 1, wherein the first and second metal patterns overlap the data line.

4. The substrate according to claim 1, wherein the first metal pattern in one pixel region is integrated with the second metal pattern in another pixel region.

5. The substrate according to claim 1, wherein the first and second metal patterns are on a same layer and comprised of a same material as the gate line.

6. The substrate according to claim 1, wherein the plurality of third portions have an angle between 0 degree and 45 degrees with regard to the first direction.

7. The substrate according to claim 1, wherein the first and second transparent conductive materials include one of ITO and IZO.

8. The substrate according to claim 1, wherein the gate line includes first, second and third layers.

9. The substrate according to claim 8, wherein the first layer is on a same layer and comprised of a same material as the common electrode, and the second and third layers include Mo and AlNd, respectively.

10. The substrate according to claim 9, further comprising first and second metal patterns each including fourth and fifth layers disposed between the common electrode and the data line, wherein the fourth layer is on a same layer and comprised of a same material as the second layer, and the fifth layer is on a same layer and comprised of a same material as the third layer.

* * * * *